United States Patent [19]
Szeliski et al.

[11] Patent Number: 5,986,668
[45] Date of Patent: Nov. 16, 1999

[54] DEGHOSTING METHOD AND APPARATUS FOR CONSTRUCTION OF IMAGE MOSAICS

[75] Inventors: Richard Szeliski; Heung-Yeung Shum, both of Bellevue, Wash.

[73] Assignee: Microsoft Corporation, Redmond, Wash.

[21] Appl. No.: 08/905,103

[22] Filed: Aug. 1, 1997

[51] Int. Cl.⁶ .................................................. G06F 15/00
[52] U.S. Cl. ............................................................ 345/433
[58] Field of Search .................................... 345/433, 435, 345/437, 438, 474, 475, 113, 114

[56] References Cited

U.S. PATENT DOCUMENTS 5,553,221  9/1996  Reimer et al. ........................... 395/762
5,708,826  1/1998  Ikeda et al. .............................. 345/348

OTHER PUBLICATIONS

Richard Szeliski and James Coughlan, "Spine–Based Image Registration," *Tech Report CRL 94/1*, Digital Equipment Corporation, Cambridge Research Lab, Cambridge, MA, Apr., 1994.

P. Anandan et al., editors. IEEE Workshop on Representations of Visual Scenes, Cambridge, Massachusetts, Jun. 1995, IEEE Computer Society Press. pp. 10–17.

Anonymous. Creating full view panoramic image mosaics and texture–mapped models. In Computer Graphics Proceedings Annual Conference Series, Proc. SIGGRAPH'97 (Los Angeles) Aug. 1997, ACM SIGGRAPH. pp. 251–258.

J. R. Bergen, P. Anandan, K. J. Hanna, and R. Hingorani. Hierarchical model–based motion estimation. In Second European Conference on Computer Vision (ECCV'92), pp. 237–252, Santa Margherita Liguere, Italy, May 1992. Springer–Verlag.

S. J. Gortler, R. Grzeszczuk, R. Szeliski, and M.F. Cohyen. The lumigrap. In Computer Graphics Proceedings, Annual Conference Series, pp. 43–54, Proc. SIGGRAPH'96 (New Orleans), Aug. 1996. ACM SIGGRAPH.

S. E. Chen. QuickTime VR—an image–based approach to virtual environment navigation. Computer Graphics (SIGGRAPH'95), pp. 29–38, Aug. 1995.

R. I. Hartley. Self–calibratioin from multiple views of a rotating camera. In Third European Conference on Computer Vision (ECCV'94), vol. 1, pp. 471–478, Stockholm, Sweden, May 1994. Springer–Verlag.

M. Irani, S. Hsu, and P. Anandan. Video compression using mosaic representations. Signal Processing: Image Communication, 7:529–552, 1995.

S. B. Kang and R. Weiss. Characterization of errors in compositing panoramic images, Technical Report 96/2, Digital Equipment Corporation, Cambridge Research Lab, Jun. 1996.

(List continued on next page.)

*Primary Examiner*—Phu K. Nguyen
*Attorney, Agent, or Firm*—Michaelson & Wallace; Peter L. Michaelson; Robert M. Wallace

[57] ABSTRACT

The invention is embodied in a deghosting method and apparatus which locally aligns individual images in a set of overlapping images of a mosaic. This is accomplished by determining, at plural predetermined pixel locations of each one of the images, motions between the one image and other images of the set, combining the motions to produce an estimated motion at each of the plural predetermined pixel locations of the one image, and then warping the one image in accordance with the estimated motions. Preferably, it is first which of the images of the set overlies the one image. This determination is made by determining alignment transformations relating the images to a 3-dimensional coordinate system and then inferring mutual overlap between images from the transformations. The images are resampled in accordance with these alignment transformations. The warping of each image is accomplished by constructing a mapping of warped pixel locations from the estimated motions and then resampling the one image at the warped pixel locations. The mapping is preferably a reverse mapping of pixels in an unwarped version of the one image.

65 Claims, 25 Drawing Sheets

OTHER PUBLICATIONS

M.–C. Lee et al. A layered video object ocding system using sprite and affine motion model. IEEE Transactions on Circuits and Systems For Video technology, 7(1):130–145, Feb. 1997.

M. Levoy and P. Hanrahan. Light field rendering. In Computer Graphics Proceedings, Annual Conference Series, pp. 31–42, Proc. SIGGRAPH'96 (New Orleans), Aug. 1996. ACM SIGGRAPH.

B.D. Lucas and T. Kanade. An iterative image registration technique with an application in stereo vision. In Seventh International Joint Conference on Artificial Intelligence (IJCAI–81), pp. 674–679, Vancouver, 1981.

H. E. Malde. Panoramic photographs. American Scientist, 71(2):132–140, Mar.–Apr. 1983.

L. McMillan and G. Bishop. Plenoptic modeling: An image–based rendering system. Computer Graphics (SIGGRAPH'95), pp. 39–46, Aug. 1995.

S. Mann and R. W. Picard. Virtual bellows: Constructing high–quality images from video. In First IEEE International Conference on Image Processing (ICIP–94), vol. I, pp. 363–367, Austin, Texas, Nov. 1994.

W. H. Press, B.P. Flannery, S. A. Teukolsky, and W.T. VCetterling. Numerical Recipes in C: The Art of Scientific Computing. Cambridge University Press, Cambridge, England, second edition, 1992.

G. S. Stein. Accurate internal camera calibration using rotation, with analysis of sources of error. In Fifth International Conference on Computer Vision (ICCV'95), pp. 230–236, Cambridge, Massachusetts, Jun. 1995.

R. Szeliski. Image mosaicing for tele–reality applications. In IEEE Workshop on Applications of Computer Vision (WACV'94), pp. 44–53, Sarasota, Florida, Dec. 1994. IEEE Computer Society.

R. Szeliski. Video mosaics for virtual environments. IEEE Computer Graphics and Applications, pp. 22–30, Mar. 1996.

G. Wolberg "Digital Image Warping" IEEE Computer Society Press, Los Alamitos, Ca. 1990.

Ned Greene, New York Institute of Technology "Environment Mapping and Other AQpplications Of World Projections" IEEE, Nov. 1986, pp. 21–29.

Roger Y. Tsai. "A Versatil,e Camera Calibration Technique for High–Accuracy 3D Machine Vision Metrology Using Off–The–Shelf TV Camerads and Lenses" IEEE Journal of Robotics and Automation vol. RA–3, Aug. 1987, pp. 323–344.

Hank Weghorst, Gary Hooper, and Donald P. Greenberg, Cornell University ACM Transactions on Graphics, vol. 3, No. 1, Jan. 1984. pp. 52–69.

Lance Williams. Computer Graphics Laboratory New York Institute of Technology Old Westbury, New York, ACM 0–89791–10–9–1/83, Computer Graphics vol. 17, No. 3, Jul. 1983, pp. 1–11.

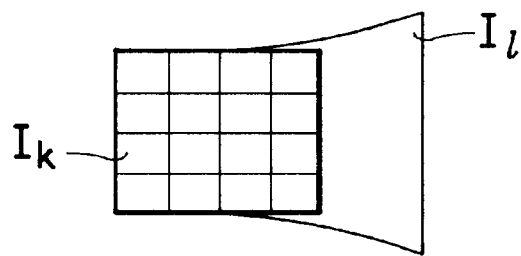
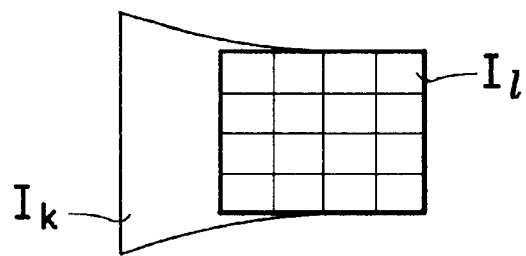
FIG. 21     FIG. 22
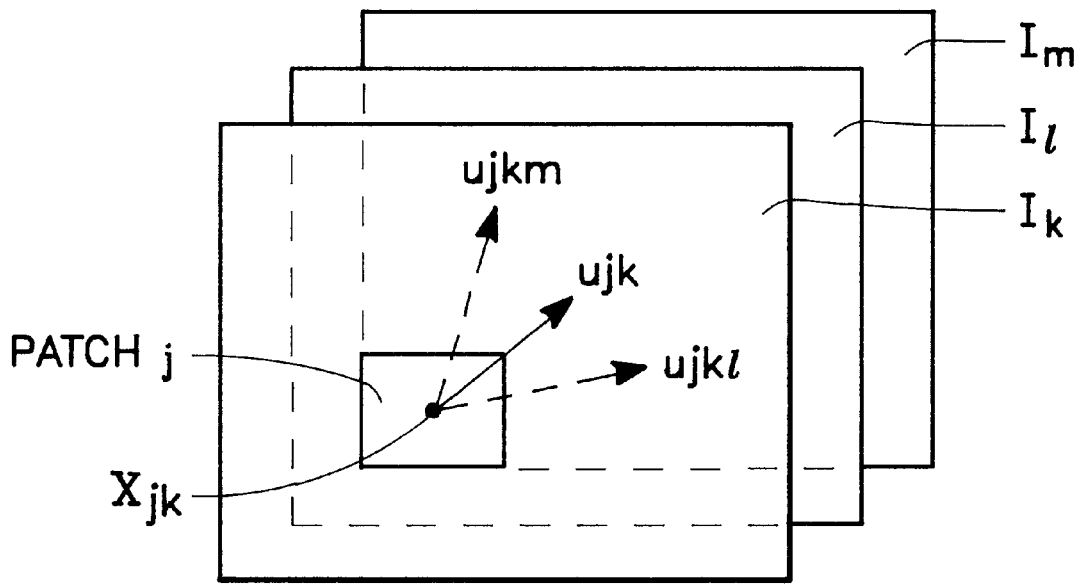
FIG. 23

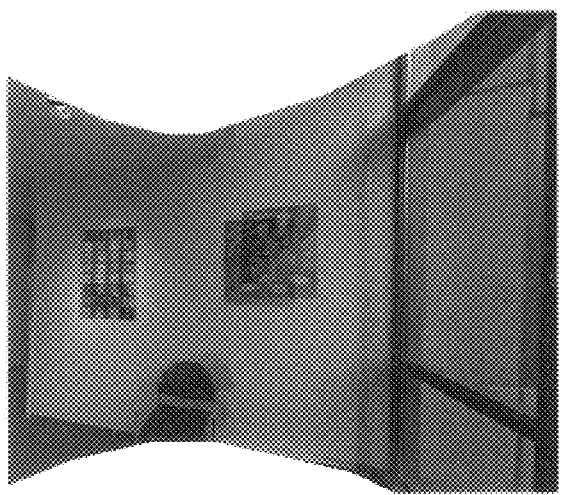 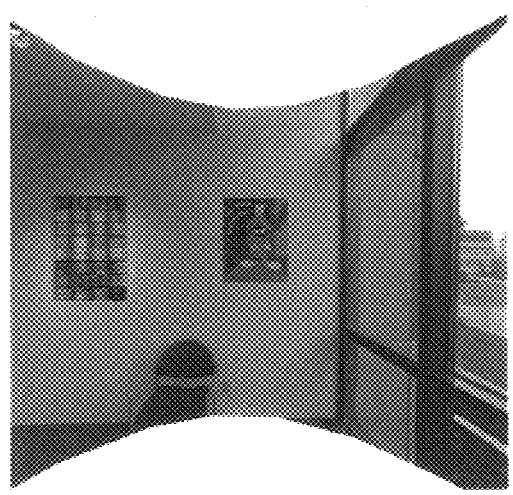
FIG. 33A    FIG. 33B
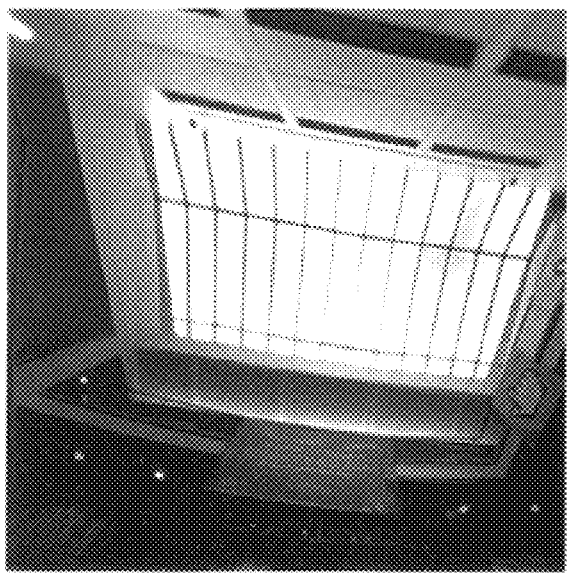 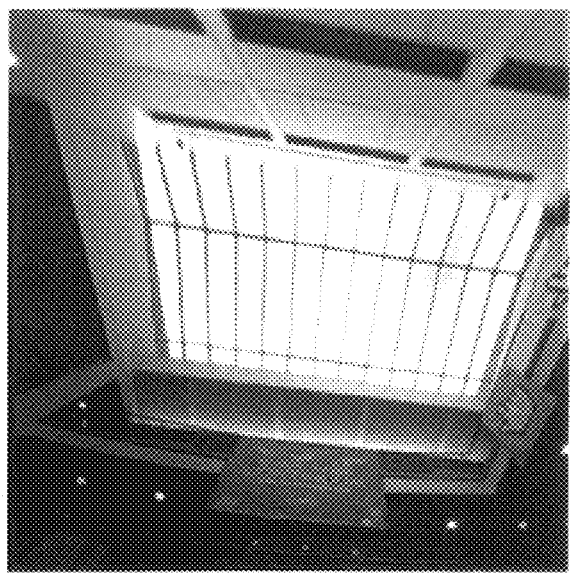
FIG. 33C    FIG. 33D

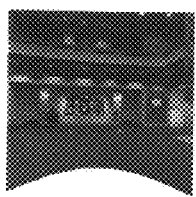 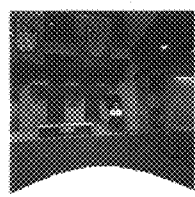 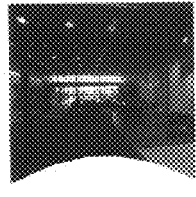 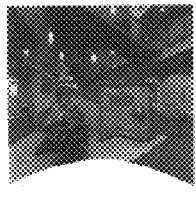
FIG. 37A   FIG. 37B   FIG. 37C   FIG. 37D
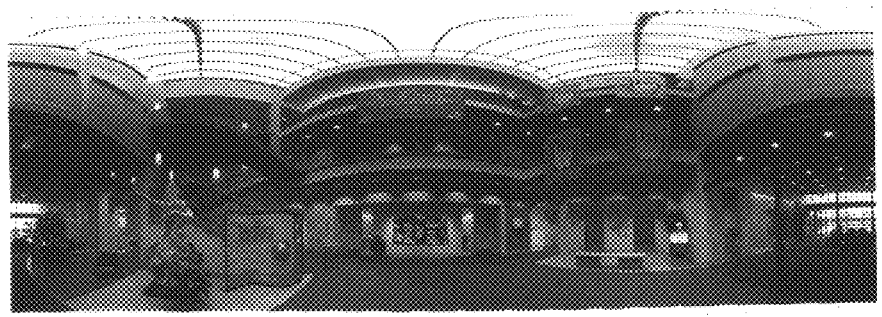
FIG. 38

DEGHOSTING METHOD AND APPARATUS FOR CONSTRUCTION OF IMAGE MOSAICS

BACKGROUND OF THE INVENTION

1. Technical Field

The invention is related to computer systems for constructing and rendering panoramic mosaic images from a sequence of still images, video images or scanned photographic images or the like.

2. Background Art

Image-based rendering is a popular way to simulate a visually rich tele-presence or virtual reality experience. Instead of building and rendering a complete 3D model of the environment, a collection of images is used to render the scene while supporting virtual camera motion. For example, a single cylindrical image surrounding the viewer enables the user to pan and zoom inside an environment created from real images. More powerful image-based rendering systems can be built by adding a depth map to the image or by using a larger collection of images.

The present invention is particularly directed to image-based rendering systems without any depth information, i.e., those which only support user panning, rotation, and zoom. Most of the commercial products based on this idea (such as QuickTime VR) use cylindrical images with a limited vertical field of view, although newer systems support full spherical maps (e.g., Interactive Pictures, and RealVR). A number of techniques have been developed for capturing panoramic images of real-world scenes. One way is to record an image onto a long film strip using a panoramic camera to directly capture a cylindrical panoramic image. Another way is to use a lens with a very large field of view such as a fisheye lens. Mirrored pyramids and parabolic mirrors can also be used to directly capture panoramic images. A less hardware-intensive method for constructing full view panoramas is to take many regular photographic or video images in order to cover the whole viewing space. These images must then be aligned and composited into complete panoramic images using an image mosaic or "stitching" method. Most stitching systems require a carefully controlled camera motion (pure pan), and only produce cylindrical images.

Cylindrical panoramas are commonly used because of their ease of construction.

To build a cylindrical panorama, a sequence of images is taken by a camera mounted on a leveled tripod. If the camera focal length or field of view is known, each perspective image can be warped into cylindrical coordinates. To build a cylindrical panorama, 3D world coordinates are mapped to 2D cylindrical screen coordinates using $$\theta = \tan^{-1}(X/Z) \text{ and } v = Y / \sqrt{X^2 + Z^2}$$

where $\theta$ is the panning angle and v is the scanline. Similarly, 3D world coordinates can be mapped into 2D spherical coordinates $\theta, \phi$ using $$\theta = \tan^{-1}(X/Z) \text{ and } \phi = \tan^{-1}\left(Y / \sqrt{X^2 + Z^2}\right).$$

Once each input image has been warped, constructing the panoramic mosaics for a leveled camera undergoing a pure panning motion becomes a pure translation problem.

Ideally, to build a cylindrical or spherical panorama from a horizontal panning sequence, only the unknown panning angles need to be recovered. In practice, small vertical translations are needed to compensate for vertical jitter and optical twist. Therefore, both a horizontal translation $t_x$ and a vertical translation $t_y$ are estimated for each input image.

To recover the translational motion, the incremental translation $\delta t = (\delta t_x, \delta t_y)$ is estimated by minimizing the intensity error between two images, $I_0$, $I_1$, $$E(\delta t) = \sum_i [I_1(\mathbf{x}'_i + \delta t) - I_0(\mathbf{x}_i)]^2$$

where $$\mathbf{x}_i = (x_i, y_i) \text{ and } \mathbf{x}'_i = (x'_i, y'_i) = (x_i + t, y_i + t_y)$$

are corresponding points in the two images, and $t=(t_x, t_y)$ is the global translational motion field which is the same for all pixels. After a first order Taylor series expansion, the above equation becomes $$E(\delta \mathbf{t}) \approx \sum_i [\mathbf{g}_i^T \cdot \delta \mathbf{t} + e_i]^2$$

where $e_i = I_1(x'_1) - I_0(x_i)$ is the current intensity or color error, and $g_i^T = \nabla I_1(x'_1)$ is the image gradient of $I_1$ at $x'_i$. This minimization problem has a simple least-squares solution, $$\left(\sum_i \mathbf{g}_i \mathbf{g}_i^T\right) \delta \mathbf{t} = -\sum_i (e_i \mathbf{g}_i).$$

To handle larger initial displacements, a hierarchical coarse-to-fine optimization scheme is used. To reduce discontinuities in intensity and color between the images being composited, a simple feathering process is applied in which the pixels in each image are weighted proportionally to their distance to the edge (or more precisely, their distance to the nearest invisible pixel). Once registration is finished, the ends are clipped (and optionally the top and bottom), and a single panoramic image is produced.

Creating panoramas in cylindrical or spherical coordinates has several limitations. First, it can only handle the simple case of pure panning motion. Second, even though it is possible to convert an image to 2D spherical or cylindrical coordinates for a known tilting angle, ill-sampling at north pole and south pole causes big registration errors. (Note that cylindrical coordinates become undefined as you tilt your camera toward north or south pole.) Third, it requires knowing the focal length (or equivalently, field of view). While focal length can be carefully calibrated in the lab, estimating the focal length of the lens by registering two or more images using conventional techniques is not very accurate.

The automatic construction of large, high-resolution image mosaics is an active area of research in the fields of photogrammetry, computer vision, image processing, and computer graphics. Image mosaics can be used for many different applications. The most traditional application is the construction of large aerial and satellite photographs from collections of images. More recent applications include scene stabilization and change detection, video compression and video indexing, increasing the field of view and resolution of a camera, and even simple photo editing. A particularly popular application is the emulation of traditional film-based panoramic photography with digital panoramic mosaics, for applications such as the construction of virtual environments and virtual travel. In computer vision, image mosaics are part of a larger recent trend, namely the study of visual scene representations. The complete description of visual scenes and scene models often entails the recovery of depth or parallax information as well.

In computer graphics, image mosaics play an important role in the field of image-based rendering, which aims to rapidly render photorealistic novel views from collections of real (or pre-rendered) images. For applications such as virtual travel and architectural walkthroughs, it is desirable to have complete (full view) panoramas, i.e., mosaics which cover the whole viewing sphere and hence allow the user to look in any direction. Unfortunately, most of the results to date have been limited to cylindrical panoramas obtained with cameras rotating on leveled tripods with carefully designed stages adjusted to minimize motion parallax. This has limited the users of mosaic building ("stitching") to researchers and professional photographers who can afford such specialized equipment. Present techniques are difficult because generally they require special camera equipment which provides pure panning motion with no motion parallax.

Problems to be Solved by the Invention:

It would be desirable for any user to be able to "paint" a full view panoramic mosaic with a simple hand-held camera or camcorder. However, this requires several problems to be overcome.

First, cylindrical or spherical coordinates should be avoided for constructing the mosaic, since these representations introduce singularities near the poles of the viewing sphere.

Second, accumulated misregistration errors need to be corrected, which are always present in any large image mosaic. For example, if one registers a sequence of images using pairwise alignments, there is usually a gap between the last image and the first one even if these two images are the same. A simple "gap closing" technique is introduced in the specification below which forces the first and last image to be the same and distributes the resulting corrections across the image sequence. Unfortunately, this approach works only for pure panning motions with uniform motion steps, a significant limitation.

Third, any deviations from the pure parallax-free motion model or ideal pinhole (perspective) camera model may result in local misregistrations, which are visible as a loss of detail or multiple images (ghosting).

SUMMARY OF THE INVENTION

The specification discloses how to avoid using cylindrical or spherical coordinates for constructing the mosaic by associating a rotation matrix (and optionally a focal length) with each input image, and performing registration in the input image's coordinate system. Such mosaics are referred to herein as rotational mosaics. The system can use a postprocessing stage to project such mosaics onto a convenient viewing surface, i.e., to create an environment map represented as a texture-mapped polyhedron surrounding the origin.

The specification discloses a global optimization process, which solves the problem of accumulated misregistration errors, to find the optimal overall registration.

The deghosting method and apparatus claimed in this application solves the problem of loss of detail or image ghosting is solved by computing local motion estimates (block-based optical flow) between pairs of overlapping images, and using these estimates to warp each input image so as to reduce the misregistration. This is less ambitious than actually recovering a perspective depth value for each pixel, but has the advantage of being able to simultaneously model other effects such as radial lens distortions and small movements in the image.

The invention is embodied in a deghosting method and apparatus which locally aligns individual images in a set of overlapping images of a mosaic. This is accomplished by determining, at plural predetermined pixel locations of each one of the images, motions between the one image and other images of the set, combining the motions to produce an estimated motion at each of the plural predetermined pixel locations of the one image, and then warping the one image in accordance with the estimated motions. Preferably, it is first determined which of the images of the set overlies the one image. This determination is made by determining alignment transformations relating the images to a 3-dimensional coordinate system and then inferring mutual overlap between images from the transformations. The images are resampled in accordance with these alignment transformations.

The warping of each image is accomplished by constructing a mapping of warped pixel locations from the estimated motions and then resampling the one image at the warped pixel locations. The mapping is preferably a reverse mapping of pixels in an unwarped version of the one image.

Preferably, the plural predetermined pixels are a sparse set of pixel locations of the one image and the mapping is constructed by computing an estimated motion for a dense set of pixel locations in the one image based upon the estimated motions of the sparse set of predetermined pixel locations.

In the preferred embodiment, the image is divided into plural patches, and a center pixel location of each patch is one of the predetermined (sparse) pixel locations. The dense set of pixel locations preferably constitutes all pixel locations in the one image.

The estimated motion for the dense set of pixel locations is computed by computing, for each pixel location of the dense set of pixel locations, an average of estimated motions of neighboring ones of the plural predetermined pixel locations weighted in accordance with their proximity to the one pixel location. Combining the motions to produce an estimated motion is accomplished by computing a normalized average of the motions. Preferably, the process includes downweighting the motions in the average by a fraction proportional to the number n of the motions in the average. This fraction is selected to avoid or minimize overcorrection, and is preferably $1/(n+1)$. The foregoing process is performed for all of the images simultaneously.

The invention can be used to create full view panoramic mosaics from image sequences. Unlike current panoramic stitching methods, which usually require pure horizontal camera panning, the disclosed system does not require any controlled motions or constraints on how the images are taken (as long as there is no strong motion parallax). For example, images taken from a hand-held digital camera can be stitched seamlessly into panoramic mosaics.

By taking as many images as needed, image mosaics can be constructed which cover as large a field of view as desired, e.g., a complete environment map. Because the image mosaics is represented in the invention using a set of transforms, there are no singularity problems such as those existing at the top and bottom of cylindrical or spherical maps. This method is fast and robust because it directly recovers 3D rotations instead of general 8 parameter planar perspective transforms. By mapping the mosaic onto an arbitrary texture-mapped polyhedron surrounding the origin, the virtual environment can be viewed or explored using standard 3D graphics viewers and hardware without requiring special-purpose players. Once a mosaic has been constructed, it can, of course, be mapped into cylindrical or spherical coordinates, and displayed using a special purpose viewer. Such specialized representations are not necessary, and represent just a particular choice of geometry and texture coordinate embedding. Instead, using a mapping process described herein, the mosaic can be converted to an environment map, i.e., by mapping the mosaic onto any texture-mapped polyhedron surrounding the origin. This allows the use of standard 3D graphics APIs and 3D model formats, and allows the use of 3D graphics accelerators for texture mapping. The mapping process can be employed in a rendering process that can be just as fast as special-purpose viewers. Furthermore, the mapping process can take advantage of 3D graphics (rendering) hardware, support multi-resolution textures, and allow for easy integration with regular 3D graphics.

BRIEF DESCRIPTION OF THE DRAWINGS

FIGS. 21 and 22 illustrate complementary warpings of each image in an overlapping pair of images in accordance with the deghosting method of FIG. 20.

FIG. 23 illustrates the averaging of plural pair-wise motion estimates in accordance with one aspect of the deghosting method.

FIGS. 33A–37D and 38 are panoramic images obtained using different aspects of the present invention in accordance with respective working examples.

DETAILED DESCRIPTION OF THE PREFERRED EMBODIMENTS
INTRODUCTION:

This specification describes how to associate a rotation matrix (and optionally a focal length) with each input image, rather than explicitly projecting all of the images onto a common surface (e.g., a cylinder). In order to reduce accumulated registration errors, a global alignment (block adjustment) is applied to the whole sequence of images, which results in an optimal image mosaic (in the least-squares sense). To compensate for small amoints of motion parallax introduced by translations of the camera and other unmodeled distortions, a local alignment (deghosting) method is employed which warps each image based on the results of pairwise local image registrations. Combining both global and local alignment significantly improves the quality of the image mosaics, thereby enabling the creation of full view panoramic mosaics with hand-held cameras.

Figure 1:
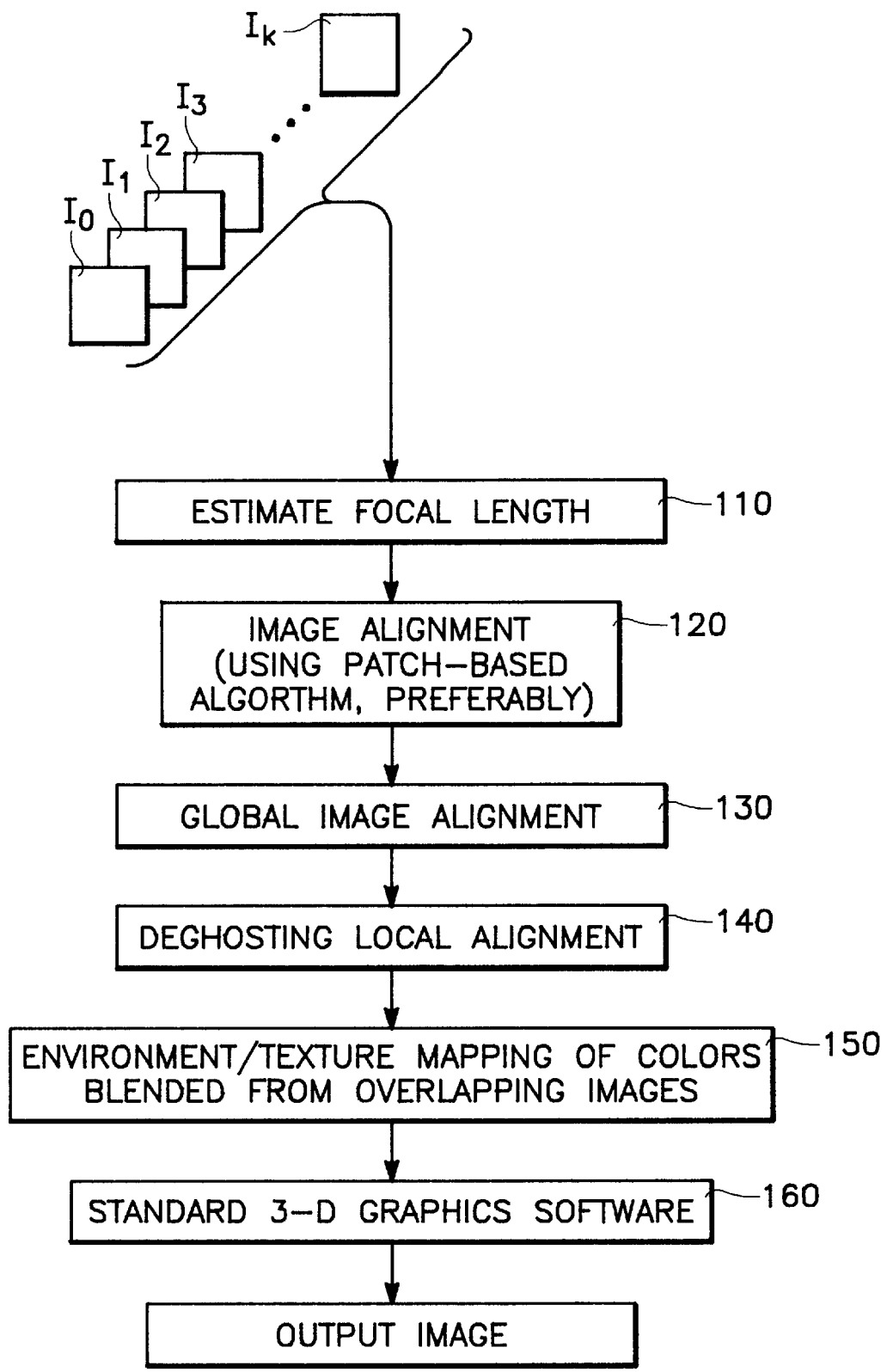
FIG. 1 is a block diagram illustrating the operation of a system embodying the invention.

The overall flow of processing in the system is illustrated in FIG. 1. First, if the camera intrinsic parameters are unknown, the user creates a small mosaic using a planar perspective motion model, from which a rough estimate of the focal length is computed (block 110 of FIG. 1). Next, a complete initial panoramic mosaic is assembled sequentially by adding one image at a time and adjusting its position using the rotational motion model (block 120 of FIG. 1). Then, global alignment (block adjustment) is invoked to modify each image's transformation (and focal length) such that the global error across all possible overlapping image pairs is minimized (block 130 of FIG. 1). This stage also removes any large inconsistencies in the mosaic, e.g., the "gaps" that might be present in a panoramic mosaic assembled using the sequential method. Then, a local alignment (deghosting) method is invoked to reduce any local misregistration errors (block 140 of FIG. 1). The final mosaic can be stored as a collection of images with associated transformations, or optionally converted into a texture-mapped polyhedron (environment map) (block 150 of FIG. 1). By mapping the mosaic onto an arbitrary texture-mapped polyhedron surrounding the origin, the virtual environment is viewed using standard 3D graphics viewers and hardware (block 160) without requiring special purpose players.

Exemplary Operating Environment

Figure 2A:
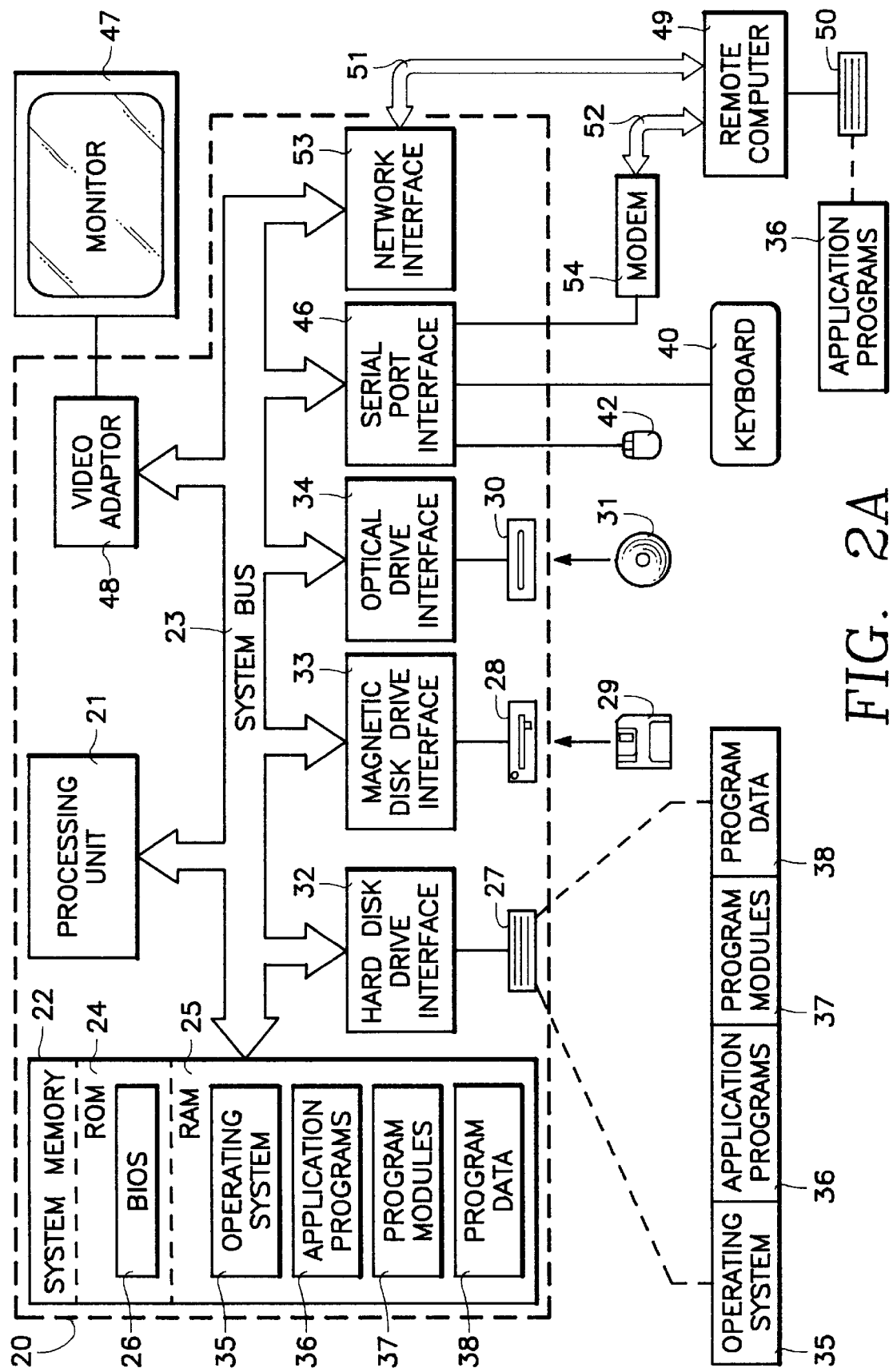
FIGS. 2A and 2B is a block diagram illustrating apparatus embodying a system of the invention.

FIG. 2A and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located both local and remote memory storage devices.

With reference to FIG. 2A, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2A. The logical connections depicted in FIG. 2A include a local area network (LAN) 51 and a wide area network (WAN) 52. Such networking environments are commonplace in offices, enterprise-wide computer networks, intranets and Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2B:
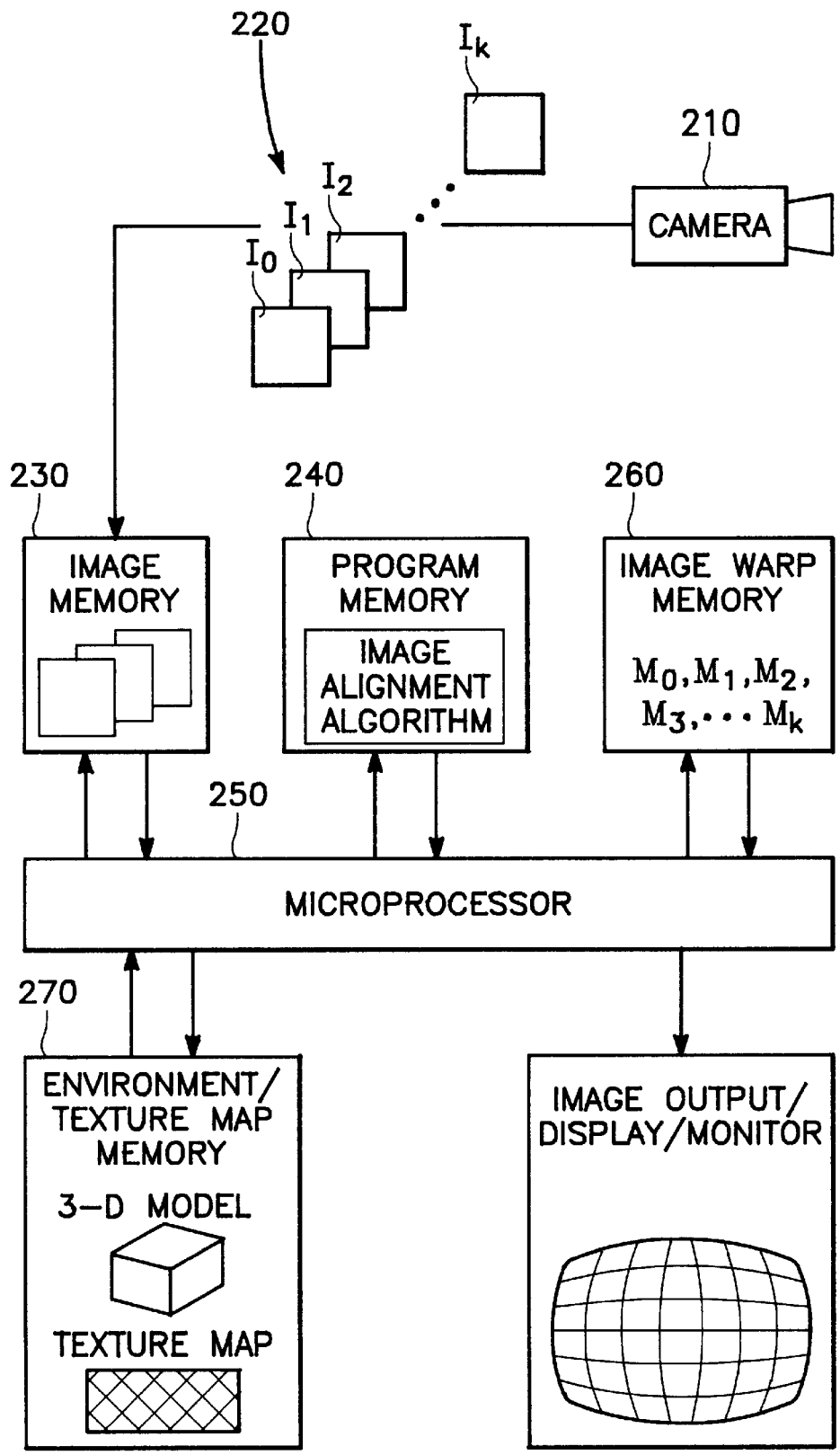

The hardware or apparatus of FIG. 2A may be modified to include additional features in order to carry out the present invention, as illustrated in FIG. 2B. In FIG. 2B, a camera 210 (such as a digital/electronic still or video camera or film or photographic scanner) captures a sequence of images 220 which are then stored in an image memory 230. The method or processes of the invention are stored as a sequence of program instructions in a program memory 240 for execution by a microprocessor 250. The microprocessor 250, in carrying out the instructions it fetches from the program memory 240, fetches individual ones of the images stored in the image memory 230 and computes a transformation or camera matrix M for each image. The collection of camera matrices M generated by the microprocessor 250 are stored in an image warp memory 260. From these, the microprocessor, in carrying out other program instructions stored in the program memory 240, constructs an environment model-based texture map which is stored in an environment/texture map memory 270. The microprocessor 250 can then employ standard graphics techniques in taking the texture maps stored in the texture map memory 270 to create panoramic images which it displays in an image display device or medium 280.

ALIGNMENT FRAMEWORK AND MOTION MODELS:

Incremental Alignment

In the invention, image mosaics are represented as collections of images with associated geometrical transformations. The first stage of the mosaic construction method computes an initial estimate for the transformation associated with each input image. This is done by processing each input image in turn, and finding the best alignment between this image and the mosaic constructed from all previous images. (To speed up this part, one option is to register with only the previous image in the sequence.) This reduces the problem to that of parametric motion estimation. A well-known hierarchical motion estimation framework is employed consisting of four parts: (i) pyramid construction, (ii) motion estimation, (iii) image warping, and (iv) coarse-to-fine refinement. An important element of this framework, which the present invention exploits, is to perform the motion estimation between the current new input image and a warped (resampled) version of the mosaic. This allows us to estimate only incremental deformations of images (or equivalently, instantaneous motion), which greatly simplifies the computations required in the gradient descent method.

Figure 3:
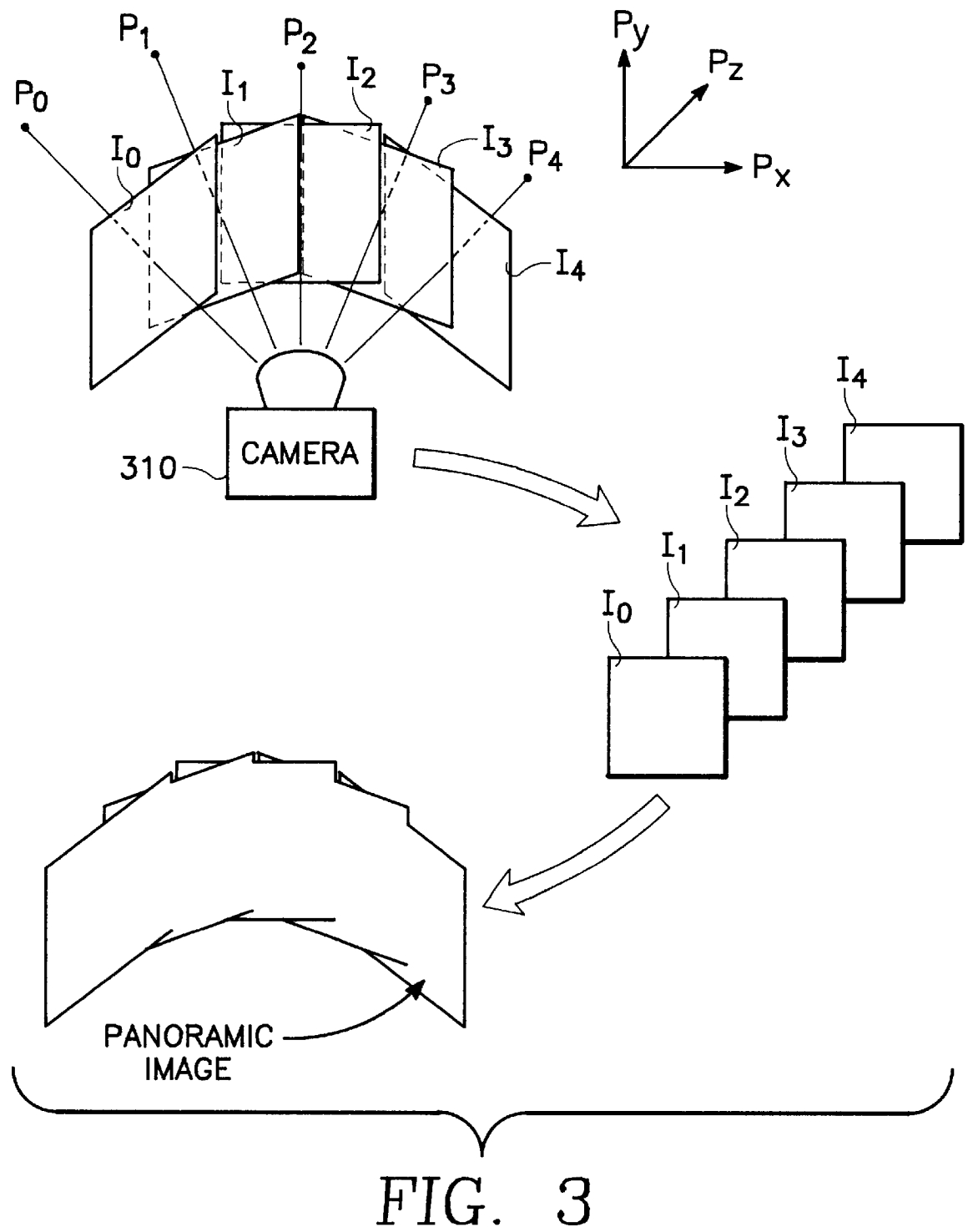
FIG. 3 illustrates apparatus including a camera employed for the acquisition of images to form a panoramic image.
Figure 4:
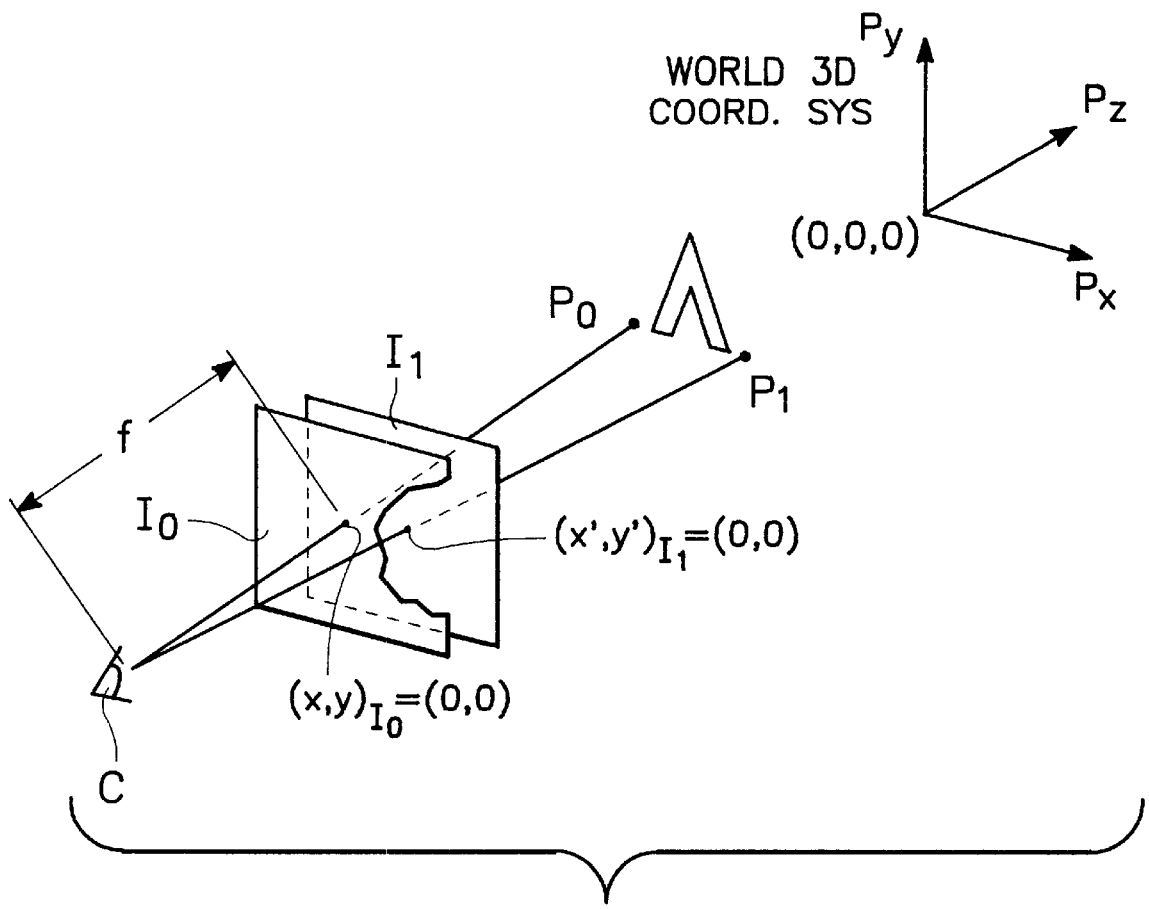
FIG. 4 is a detailed view of a portion of the apparatus of FIG. 3.
Figure 5:
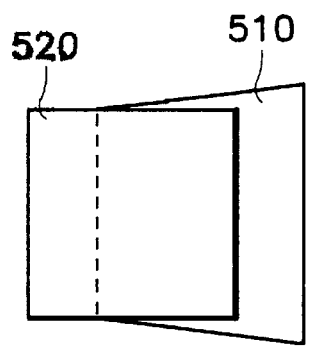
FIG. 5 illustrates a perspective warping and image.

In the invention, the camera motion, unlike many prior art methods, is not at all restricted to a simple panning motion, but is permitted to be any suitable three-dimensional rotation, a significant advantage. However, for the sake of clarity of illustration, FIG. 3 illustrates a tutorial example in which the camera motion is restricted to a simple pure panning motion. Referring to FIGS. 3 and 4, a camera 310 having its optical center fixed at point C (FIG. 3) captures a sequence of 2D still images $I_0, I_1, I_2, I_3, \ldots$ as it pans, the center rays of these images being focused on 3D points $P_0, P_1, P_2, P_3, \ldots$ at a focal length f from the optical center point C. The points $P_i$ are defined relative to a fixed 3D world coordinate system $P_x, P_y, P_z$ indicated in the drawings. Each 2D image I has its own 2D x–y coordinate system whose origin (x,y)=(0,0) may be considered to be at the center of the image. Thus, for example, image $I_0$ may have coordinates x=(xy) while image $I_1$ may have coordinates x'=(x',y'). The object is to register all of the images so that a panorama 320 may be constructed. An example of how perspective transforms would warp one of the images 510 to register it with another image 520 with which it overlaps is illustrated in FIG. 5. FIG. 5 illustrates the "keystoning" effect of the warping of the image 510 required to produce the desired registration between the two images. The problem is that the transformation (or the camera motion) between the two images $I_0$ and $I_1$ is unknown so that a transformation between x and x' must be inferred from the images themselves before the images can be registered.

In order to register the two images $I_0$ (x) and $I_1$(x'), where x' is computed using some parametric motion model m, i.e., x'=f(x;m), the warped image is first computed in accordance with $$\tilde{I}_1(x) = I_1(f(x;m)) \quad (1)$$

Figure 7:
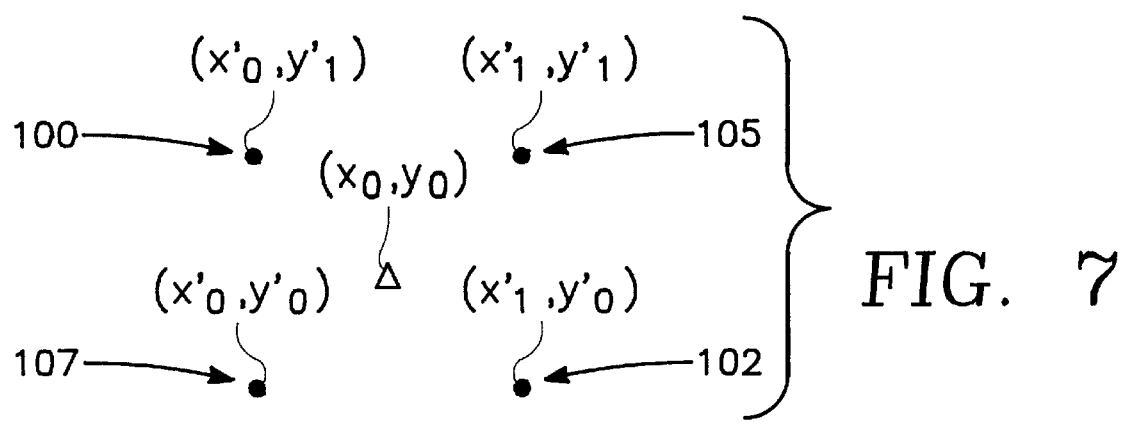
FIG. 7 illustrates a pixel resampling problem encountered in the incremental image alignment method.

In the current implementation, bilinear pixel resampling is employed as illustrated in FIG. 7. The trick is then to find a deformation of $\tilde{I}_1$ (x) which brings it into closer registration with $I_0$(x) and which can also be used to update the parameter m. The warp/register/update loop can then be repeated. This specification describes how this can be done for two different transformation models, namely 8-parameter planar perspective transformations, and 3D rotations, and how this can be generalized to other motion models and parameters.

Given two images taken from the same viewpoint (optical center) but in potentially different directions (and/or with different intrinsic parameters), the relationship between two overlapping images can be described by a planar perspective motion model. The planar perspective transformation warps an image into another using $$x' \sim Mx = \begin{bmatrix} m_0 & m_1 & m_2 \\ m_3 & m_4 & m_5 \\ m_6 & m_7 & m_8 \end{bmatrix} \begin{bmatrix} x \\ y \\ 1 \end{bmatrix}, \quad (2)$$

where x=(x,y,1) and x'=(x',y',1) are homogeneous or perspective coordinates, and the symbol indicates equality up to scale. (Since the M matrix is invariant to scaling, there are only 8 independent parameters.) (It may be instructive to note here that the vector m referred to in Equation 1 is a column vector consisting of the elements $m_0, m_1, \ldots, m_8$ of the matrix M of Equation 2.) Equation 2 can be re-written as $$x' = \frac{m_0 x + m_1 y + m_2}{m_6 x + m_7 y + m_8} \quad (3)$$

$$y' = \frac{m_3 x + m_4 y + m_5}{m_6 x + m_7 y + m_8} \quad (4)$$

To recover the parameters, the process iteratively updates the transformation matrix using $$M \leftarrow (I+D)M \quad (5)$$

where $$D = \begin{bmatrix} d_0 & d_1 & d_2 \\ d_3 & d_4 & d_5 \\ d_6 & d_7 & d_8 \end{bmatrix} \quad (6)$$

Resampling image $I_1$(x') with the new transformation x'~ (I+D)Mx is the same as warping the resampled image $\tilde{I}(x)$ by x"~(I+D)x, (ignoring errors introduced by the double resampling operation), i.e., $$x'' = \frac{(1+d_0)x + d_1 y + d_2}{d_6 x + d_7 y + (1+d_8)} \quad (7)$$

$$y'' = \frac{(d_3)x + (1+d_4)y + d_5}{d_6 x + d_7 y + (1+d_8)} \quad (8)$$

Figure 6:
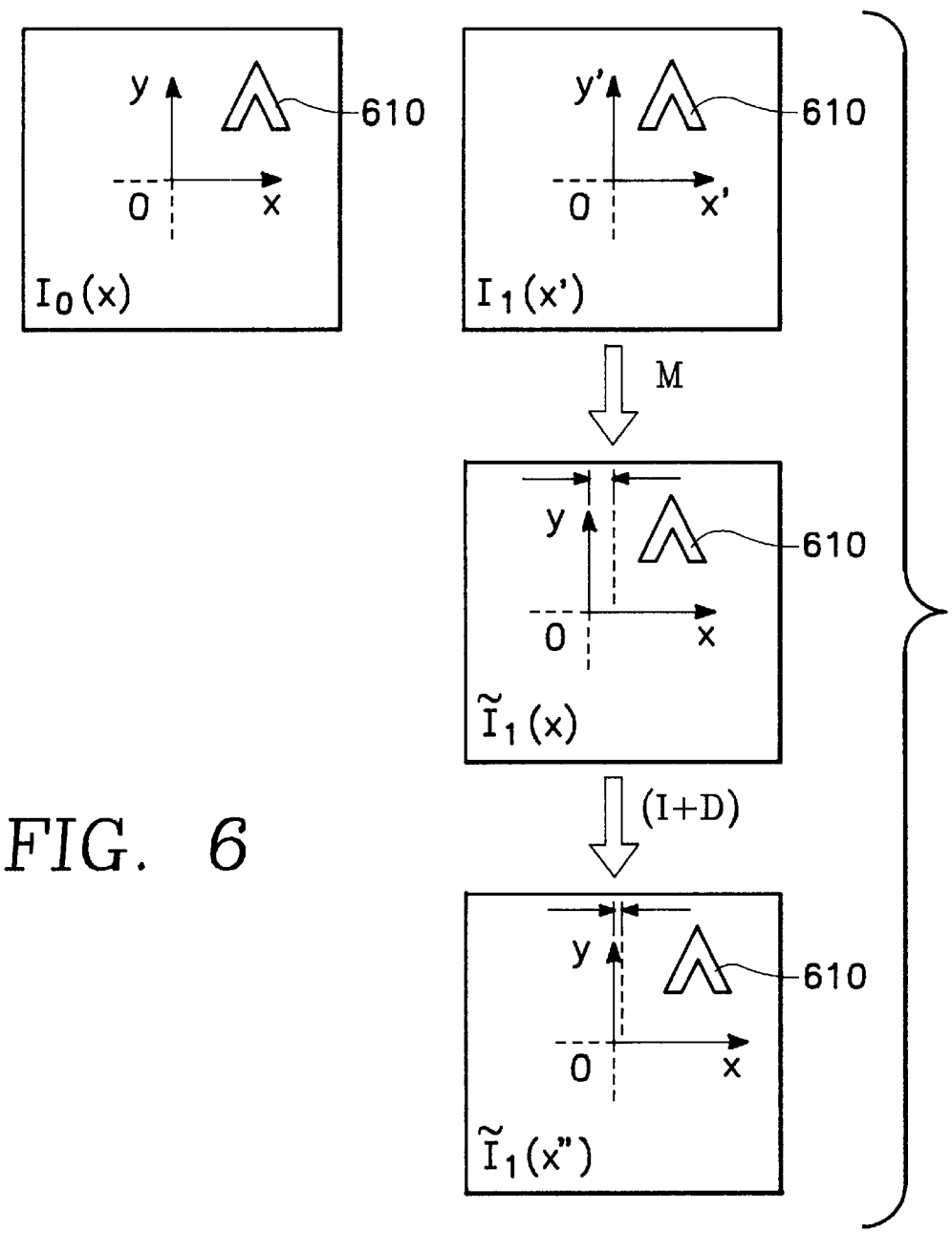
FIG. 6 illustrates a sequence of images obtained in an incremental image alignment method.

The matrix M may be thought of as producing a large change in the image as suggested in FIG. 6 in which a relatively large right-to-left corrective movement is observed from $I_1$(x') to $\tilde{I}_1$(x), while the subsequent incremental deformation D induces an additional relatively small right-to-left movement from $\tilde{I}_1$(x) to $\tilde{I}_1$(x'). If this deformation by D provides the final correction, then the placement of a fixed object 610 relative to the second image's re-warped coordinate system (x",y") is the about same as the object's placement relative to the first image's coordinate system (x,y), as indicated in FIG. 6.

The transformation of the second image's coordinate system is not likely to shift it by an integral number of image pixels. More likely, each shifted pixel coordinate of the second image will lie somewhere between neighboring pixel coordinates of the first image. FIG. 7 illustrates how a pixel being sampled at a non-integral location can be computed as a bilinear blend of the original pixels. In order to warp images, the pixels of the two images are best resampled using techniques well-known in the art, such as bilinear resampling of the type disclosed in G. Wolberg, *Digital Image Warping,* IEEE Computer Society Press, Los Alamitos, Calif., 1990.

In order to compute an appropriate value of the deformation parameter d, the process minimizes the squared error metric $$E(\mathbf{d}) = \sum_i \left[ \tilde{I}_1(\mathbf{x}_i'') - I_0(\mathbf{x}_i) \right]^2 \quad (9)$$

$$\approx \sum_i \left[ \tilde{I}_1(\mathbf{x}_i) + \nabla \tilde{I}_1(\mathbf{x}_i) \frac{\partial \mathbf{x}_i''}{\partial \mathbf{d}} \mathbf{d} - I_0(\mathbf{x}_i) \right]^2 = \sum_i [\mathbf{g}_i^T \mathbf{J}_i^T \mathbf{d} + e_i]^2 \quad (10)$$

where $e_i = \tilde{I}_1(\mathbf{x}_i) - I_0(\mathbf{x}_i)$ is the intensity or color error (one can use either intensity or three channels of color errors), $g_i^T = \Box$ $\tilde{I}_1(\mathbf{x}_i)$ is the image gradient of $\tilde{I}_1$ at $x_i$, $d=(d_0, \ldots, d_8)$ is the incremental motion parameter vector, and $J_i = J_d(x_i)$, where $$\mathbf{J_d(x)} = \frac{\partial \mathbf{x}''}{\partial \mathbf{d}} = \begin{bmatrix} x & y & 1 & 0 & 0 & 0 & -x^2 & -xy & -x \\ 0 & 0 & 0 & x & y & 1 & -xy & -y^2 & -y \end{bmatrix}^T \quad (11)$$

is the Jacobian of the resampled point coordinate x" with respect to d. (The entries in the Jacobian correspond to the optical flow induced by the instantaneous motion of a plane in 3D. It should be noted that while the Jacobian of Equation 11 is the Jacobian of the warped or resampled coordinate system, its expression on the right-hand side of Equation 11 is entirely in terms of x or (x,y), which is the original or unwarped coordinate system, and therefore it is a function of the unwarped coordinates.) This least-squares problem has a simple solution through the normal equations $$Ad = -b \quad (12)$$

where $$A = \sum_i J_i g_i g_i^T J_i^T \quad (13)$$

is the Hessian, and $$b = \sum_i e_i J_i g_i \quad (14)$$

is the accumulated gradient or residual. These equations can be solved using a symmetric positive definite (SPD) solver such as Cholesky decomposition of the type described in Press et al., *Numerical Recipes in C: The Art of Scientific Computing,* Cambridge University Press, Cambridge, England, second edition, 1992. Note that for this problem, the matrix A is singular without elimination of one of the three parameters $d_0$, $d_4$, $d_8$. In practice, we set $d_8=0$, and therefore only solve an 8-by-8 system. Translational motion is a special case of the general 8-parameter transformation where J is a 2-by-2 identity matrix because only the two parameters $m_2$ and $m_5$ are used. The translational motion model can be used to construct cylindrical and spherical panoramas if each image is warped to cylindrical or spherical coordinates image using a known focal length. Details of how to warp and construct cylindrical and spherical panoramas are well-known in the art.

Figure 8:
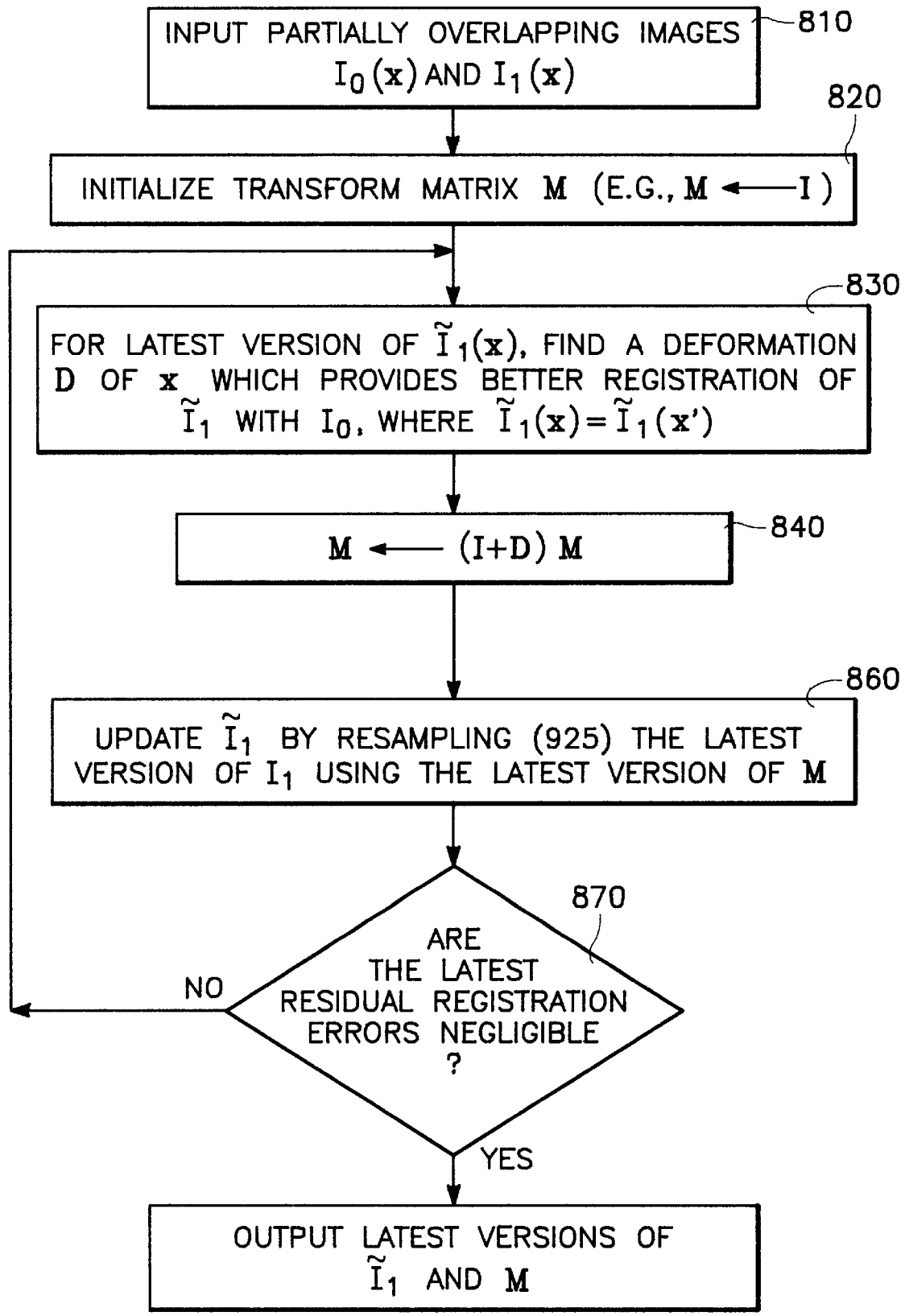
FIG. 8 is a flow diagram of the incremental alignment method.
Figure 9:
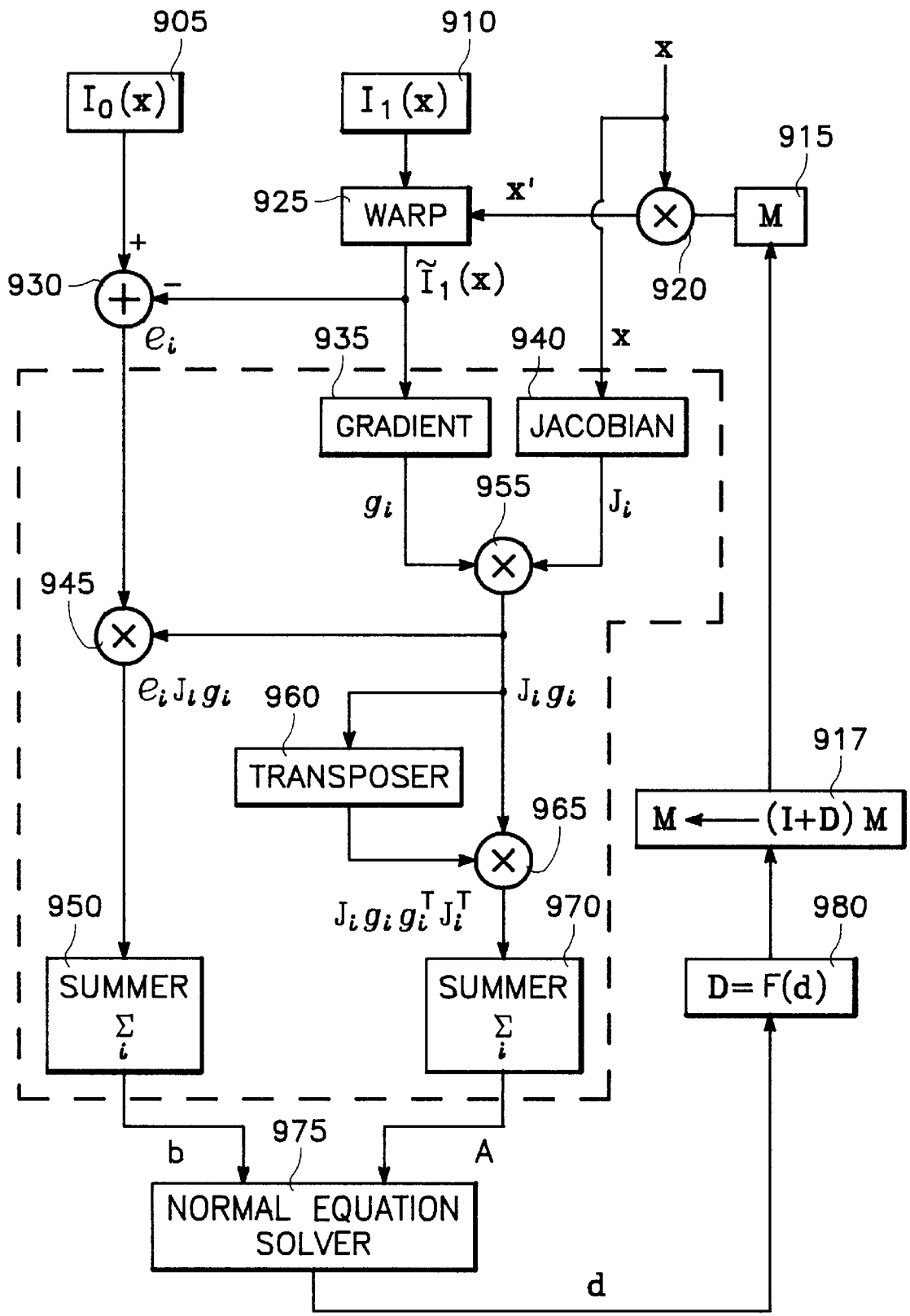
FIG. 9 is a block diagram illustrating the signal flow in the incremental alignment method of FIG. 8.

The foregoing method may be summarized with respect to the steps of FIG. 8 and the signal flow diagram of FIG. 9 as follows. A pair of overlapping images 905, 910 are input (step 810) and a transform matrix 915 of the second image is initialized (step 820).

An incremental deformation of the second image to improve the registration between the two images is computed (block 830) as will be described below in more detail with reference to FIG. 9. A matrix multiplier 917 updates the transformation matrix with the deformation (step 840). A matrix multiplier 920 transforms the current image coordinates with the transform matrix to new coordinates with which a warp operator 925 resamples the second image to produce a warped image (860).

In order to compute the deformation, a subtractor 930 subtracts the warped image from the first image to produce an error. A gradient operator 935 produces the gradient with respect to the new coordinates of the warped image while an operator 940 computes the Jacobian matrix of the new or warped coordinate system with respect to the elements of the deformation matrix. As noted previously herein, the Jacobian of the warped coordinate system is expressed as a function of the unwarped coordinates, and therefore in FIG. 9 the Jacobian-computing operator 940 receives the unwarped coordinate or vector x as an input. One advantage of this feature is that the Jacobian operator is a function of the current (unwarped) coordinate system instead of the new coordinate system, which reduces the computational burden. A multiplier 945 multiplies each error by the product of the corresponding gradients and Jacobians, and a summer 950 accumulates the resulting products to produce a residual vector b. A multiplier 955 obtains products of the gradients and Jacobians which are transposed by a transposer 960, after which another multiplier 965 combines the transposed and untransposed gradient-Jacobian products. These combined products are accumulated in a summer 970 to produce the Hessian matrix A. A normal equation solver computes the individual elements of the deformation matrix, which is then reconstructed by a reconstructor 980.

If a stopping criteria has been reached (YES branch of block 870), then the latest versions of the warped second image and of the transformation matrix are stored or output. Otherwise (NO branch of block 870), the next iteration begins starting with step 830. A stopping criteria can assume a number of forms, such as a reduction below a predetermined threshold of the errors computed by the subtractor 930, or, more preferably, a reduction below a predetermined threshold of the average displacement.

Figure 10:
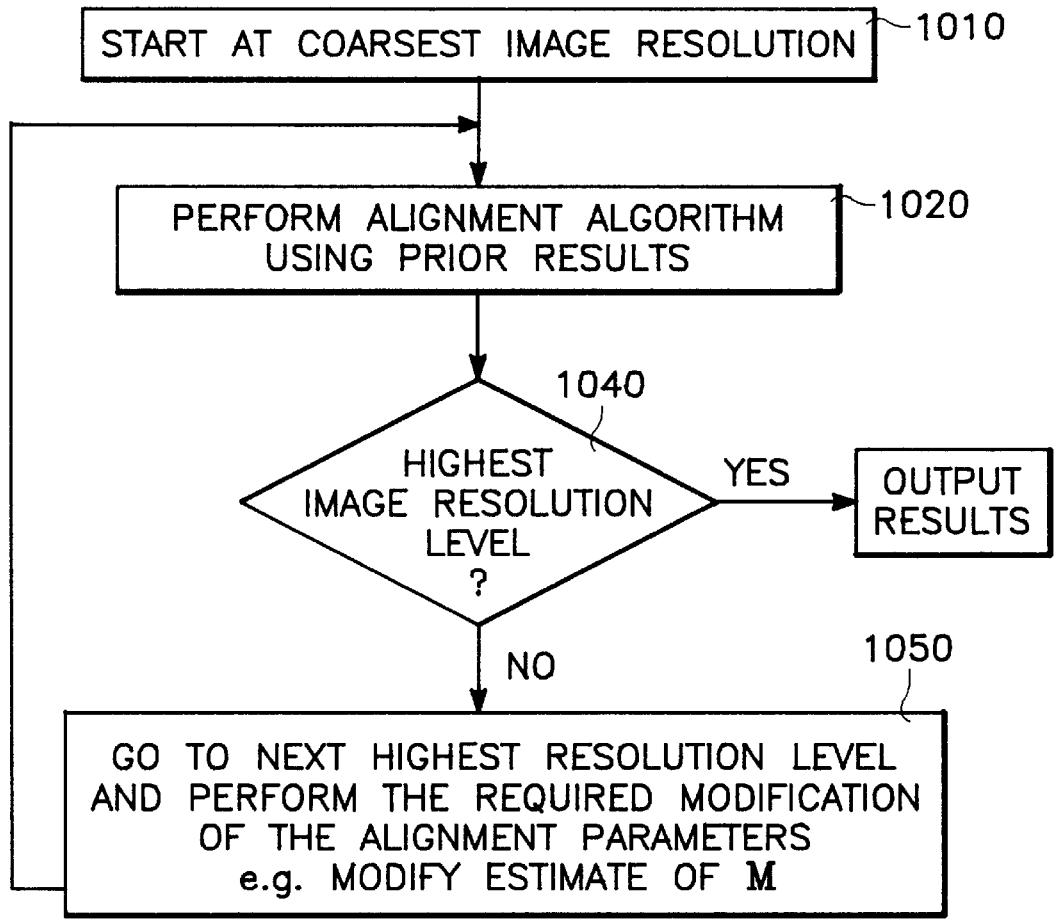
FIG. 10 is a flow diagram illustrating a coarse-to-fine resolution hierarchy employed in one embodiment.

For the foregoing image alignment method, as well as for the ones to be described below, a progressive coarse-to-fine hierarchy may be employed to advantage, in which the initial iterations of the process, which produce the roughest estimates, operate on smaller image data structures in which the image data has been reduced to a coarse version of the image, while successive iterations operate on progressively finer versions of the image until the final iteration, which operates at a resolution corresponding to that of the original image. Referring to FIG. 10, the process starts at the coarsest resolution level (step 1010), the alignment process is executed (step 1020). If the highest resolution level has not yet been reached (NO branch of block 1040), then the image data is refined to the next highest image resolution level (step 1050) and the alignment process is repeated using the prior results. It is conventional in multi-level resolution schemes, such as that employed in FIG. 10, to modify the motion parameters (e.g., the transformation M) when transitioning to the next highest resolution level in a manner well-known in the art. For example, if the planar perspective transformation of Equations 24 is employed, then for a resolution level increase by a factor of n (e.g., n=2), then certain elements of the planar perspective transform matrix M of Equation 2, namely $m_2$ and $m_5$ are increased (multiplied) by a factor of n and the elements $m_6$ and $m_7$ are decreased (divided) by a factor of n. As another example, if the rotational transformations of Equations 15 and 16 below are employed, then the focal length $f$ from which the focal length scaling matrix V is constructed (in accordance with the definitions immediately below Equation 15) is increased (multiplied) by a factor of n.

The 8-parameter perspective transformation recovery method works well provided that initial estimates of the correct transformation are close enough. However, since the motion model contains more free parameters than necessary, it suffers from slow convergence and sometimes gets stuck in local minima. For this reason, it is preferable to use the 3-parameter rotational model described next.

Incremental 3-D Rotational Alignment:

For a camera centered at the origin, the relationship between a 3D point p=(X,Y,Z) and its image coordinates x=(x,y,1) can be described by $$x \sim TVRp, \quad (15)$$

where $$T = \begin{bmatrix} 1 & 0 & c_x \\ 0 & 1 & c_y \\ 0 & 0 & 1 \end{bmatrix}, V = \begin{bmatrix} f & 0 & 0 \\ 0 & f & 0 \\ 0 & 0 & 1 \end{bmatrix}, \text{ and } R = \begin{bmatrix} r_{00} & r_{01} & r_{02} \\ r_{10} & r_{11} & r_{12} \\ r_{20} & r_{21} & r_{22} \end{bmatrix}$$

are the image plane translation, focal length scaling, and 3D rotation matrices. For simplicity of notation, it is assumed that pixels are numbered so that the origin is at the image center, i.e., $C_x=c_y=0$, allowing us to dispense with T. (In practice, mislocating the image center does not seem to affect mosaic registration methods very much). The 3D direction corresponding to a screen pixel x is given by $$p \sim R^{-1}V^{-1}x.$$

For a camera rotating around its center of projection, the mapping (perspective projection) between two images $I_k$ and $I_l$ is therefore given by $$M \sim V_l R_l R_k^{-1} V_k^{-1} \quad (16)$$

where each image $I_k$ is represented by $M_k = V_k R_k$, i.e., a focal length and a 3D rotation. The task of building image mosaics essentially becomes registering a sequence of images by recovering their transformation matrices $M_k$. Each transformation corresponds to one image and represents the mapping between the image pixels of $I_k$ and a viewing directions in the world (i.e., a 3D world coordinate system).

Assume for now that the focal length f is known and is the same for all images, i.e, $V_k$ is the same for all images. (The method for computing an estimate of $f$ from an initial set of homographies is given later in this specification.) To recover the rotation, an incremental update to $R_l$ is performed based on the angular velocity $\Omega = (\omega_x, \omega_y, \omega_z)$:

$$R_l \leftarrow \hat{R}(\Omega) R_l, M \leftarrow V \hat{R}(\omega) R_l R_k^{-1} V^{-1} \quad (17)$$

where the incremental rotation matrix $\hat{R}(\omega)$ is given by Rodriguez's formula:

$$\hat{R}(\hat{n}, \theta) = I + (\sin\theta)X(\hat{n}) + (1 - \cos\theta)X(\hat{n})^2 \quad (18)$$

with $$\theta = \|\Omega\|, \hat{n} = \Omega/\theta,$$

and where $$X(\Omega) = \begin{bmatrix} 0 & -\omega_z & \omega_y \\ \omega_z & 0 & -\omega_x \\ -\omega_y & \omega_x & 0 \end{bmatrix}$$

is the cross product operator. Keeping only terms linear in $\Omega$, the following is obtained:

$$M' \approx V[I + X(\Omega)]R_l R_k^{-1} V^{-1} = (I + D_\Omega)M, \quad (19)$$

where $$D_\Omega = VX(\Omega)V^{-1} = \begin{bmatrix} 0 & -\omega_z & f\omega_y \\ \omega_z & 0 & -f\omega_x \\ -\omega_y/f & \omega_x/f & 0 \end{bmatrix}$$

is the deformation matrix which plays the same role as D in equation (5) above. Computing the Jacobian of the entries in $D_\Omega$ with respect to $\Omega$ and applying the chain rule, the new Jacobian is obtained, corresponding to the rotational component of instantaneous rigid flow:

$$J_\Omega = \frac{\partial x''}{\partial \Omega} = \frac{\partial x''}{\partial d} \frac{\partial d}{\partial \Omega} = \begin{bmatrix} -xy/f & f + x^2/f & -y \\ -f - y^2/f & xy/f & x \end{bmatrix}^T \quad (20)$$

This Jacobian is then plugged into the previous minimization pipeline to estimate the incremental rotation vector $\Omega$, after which $R_l$ can be updated using equation (17) above. The 3D rotation estimation is thus a special case of general 8-parameter perspective transformation, and is more robust and efficient because this process only handles 3 unknowns instead of 8.

Figure 11:
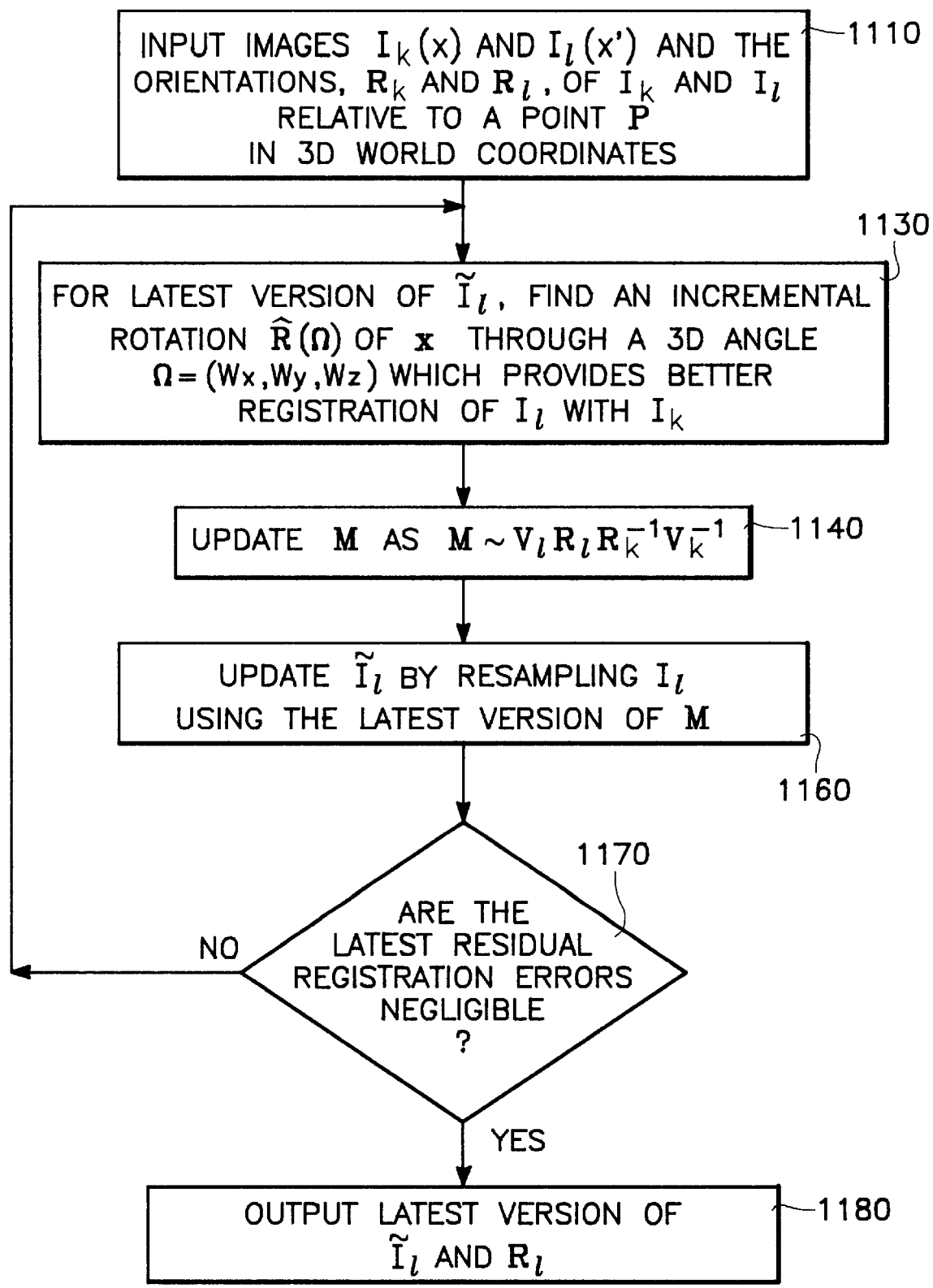
FIG. 11 is a flow diagram of the incremental 3D rotation alignment method.

The foregoing 3D rotation alignment method may be summarized with respect to the steps of FIG. 11 and the signal flow diagram of FIG. 12 as follows. A pair of overlapping images 1205, 1210 are input (step 1110) and a transform matrix 1215 of the second image is initialized (step 1120). An incremental rotation of the second image to improve the registration between the two images is computed (block 1130) as will be described below in more detail with reference to FIG. 12. A matrix multiplier 1217 updates the transformation matrix with the incremental rotation in accordance with Equation 16 (step 1140). A matrix multiplier 1220 transforms the current image coordinates with the transform matrix to new coordinates with which a warp operator 1225 resamples the second image to produce a warped image (step 1160).

In order to compute the incremental rotation, a subtractor 1230 subtracts the warped image from the first image to produce an error. A gradient operator 1235 produces the gradient with respect to the new coordinates of the warped image while a Jacobian operator 1240 computes the Jacobian matrix of the current coordinate system with respect to the elements of the incremental rotation matrix. A multiplier 1245 multiplies each error by the product of the corresponding gradient and Jacobian, and a summer 1250 accumulates the resulting products to produce a residual vector b. A multiplier 1255 obtains products of the gradients and Jacobians which are transposed by a transposer 1260, after which another multiplier 1265 combines the transposed and untransposed gradient-Jacobian products. These combined products are accumulated in a summer 1270 to produce the Hessian matrix A. A normal equation solver 1275 computes the incremental rotation vector Ω. An operator 1285 employs Rodriguez's formula to construct the incremental rotation matrix from the incremental rotation vector.

If a stopping criteria has been reached (such as a reduction below a predetermined threshold of the errors computed by the subtractor 1230) (YES branch of block 1170), then the latest versions of the warped second image and of the transformation matrix are stored or output. Otherwise (NO branch of block 1170), the next iteration begins starting with step 1130.

The foregoing rotational alignment method employs three-dimensional rotations to achieve the desired warping effect, and typically produces the same "keystoning" effect illustrated in FIG. 5 as the planar perspective method of Equations 1–14. Therefore, the term warping process is achieved. Accordingly, the term "warp" as employed in this specification refers generally to any process employing a transformation M to produce the desired effect, whether the transformation is a planar perspective transformation or a three-dimensional rotation transformation.

Estimating the Focal Length

In order to apply the incremental 3D rotation method, an estimate of the camera's focal length must first be obtained. A convenient way to obtain this estimate is to deduce the value from one or more perspective transforms computed using the 8-parameter method. Expanding the $V_1 R V_0^{-1}$ formulation, $$M = \begin{bmatrix} m_0 & m_1 & m_2 \\ m_3 & m_4 & m_5 \\ m_6 & m_7 & 1 \end{bmatrix} \sim \begin{bmatrix} r_{00} & r_{01} & r_{02}f_0 \\ r_{10} & r_{11} & r_{12}f_0 \\ r_{20}/f_1 & r_{21}/f_1 & r_{22}f_0/f_1 \end{bmatrix}$$

where $R = [r_{ij}]$.

In order to estimate focal lengths $f_0$ and $f_1$, it is observed that the first two rows (columns) of R must have the same norm and be orthogonal (even if the matrix is scaled), i.e., for the rows:

$$m_0^2 + m_1^2 + m_2^2/f_0^2 = m_3^2 + m_4^2 + m_5^2/f_0^2$$

$$m_0 m_3 + m_1 m_4 + m_2 m_5/f_0^2 = 0$$

and for the columns:

$$m_0^2 + m_3^2 + m_6^2 f_1^2 = m_1^2 + m_4^2 + m_7^2 f_1^2$$

$$m_0 m_1 + m_3 m_4 + m_6 m_7 f_1^2 = 0$$

From this, estimates of the focal lengths are computed as follows:

$$f_0^2 = \sqrt{\frac{m_5^2 - m_2^2}{m_0^2 + m_1^2 - m_3^2 - m_4^2}} \quad \text{if } m_0^2 + m_1^2 - m_3^2 - m_4^2 \neq 0$$

or $$f_0^2 = -\frac{m_2 m_5}{m_0 m_3 + m_1 m_4} \quad \text{if } m_0 m_3 + m_1 m_4 \neq 0 \text{ and } m_2 \neq 0.$$

as well as $$f_1^{-2} = \sqrt{\frac{m_0^2 + m_3^2 - m_1^2 - m_4^2}{m_7^2 - m_6^2}} \quad \text{if } m_7^2 - m_6^2 \neq 0$$

or $$f_1^{-2} = -\frac{m_0 m_1 + m_3 m_4}{m_6 m_7} \quad \text{if } m_6 \neq 0 \text{ and } m_7 \neq 0.$$

If the focal length is fixed for two images, the geometric mean of $f_0$ and $f_1$ is taken as the estimated focal length. When multiple estimates of $f$ are available, the median value is used as the final estimate. Once an initial set of $f$ estimates is available, these estimates can be improved as part of the image registration process, using the same kind of least squares approach as for the rotation.

Figure 13:
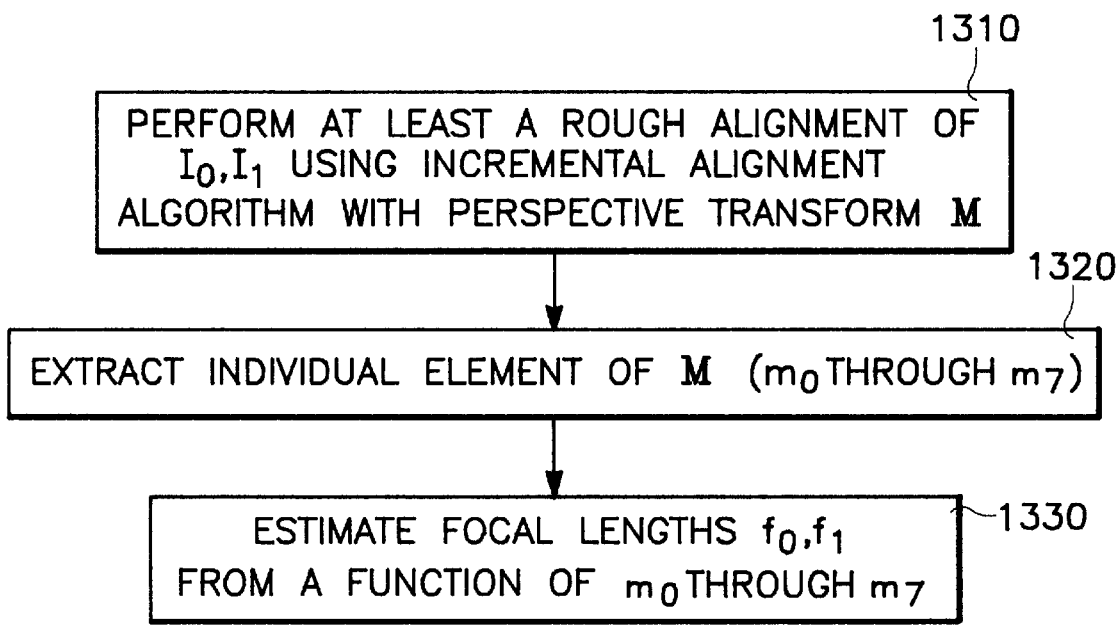
FIG. 13 is a flow diagram illustrating a focal length estimation method which can be employed in carrying out the rotation alignment method.

The process of estimating the focal length is illustrated in FIG. 13. In step 1310, an initial perspective alignment of at least some of the images is performed using the alignment method described above to provide an initial estimate of the transformation matrix M of a particular image. Then, in step 1320, initial estimates of the elements of the transformation matrix M are extracted. In step 1330, the focal length is estimated from certain elements of M in accordance with the equations for f stated above.

Other Motion Parameters:

The same general strategy can be followed to obtain the gradient b and Hessian A associated with any other motion parameters. For example, the focal length $f_k$ can be adjusted by setting $f_j = (1 + e_k)f_k$, i.e., $$M \leftarrow (I + e_k D_{110})M \qquad (21)$$

where $D_{110}$ is a diagonal matrix with entries (1,1,0). The Jacobian matrix $J_{e_k}$ is thus the diagonal matrix with entries (x,y). In other words, the process is estimating a simple re-scaling (dilation). This formula can be used to re-estimate the focal length in a video sequence with a variable focal length (zoom). If it is desired to update a single global focal length estimate, $f = (1+e)f$ the update equation and Jacobian are more complicated. This update is performed as follows:

$$M \leftarrow (I + eD_{110})VR_k R_l^{-1}V(I - eD_{110}) \approx (I + eD_e)M \qquad (22)$$

where $$D_e = D_{110} - MD_{110}M^{-1} \qquad (23)$$

(further simplifications of the second term are possible because of the special structure of $D_{110}$). The Jacobian does not have a nice simple structure, but can nevertheless be written as the product of $J_d$ and $\partial d/\partial e$, which is given by the entries in $D_e$. Note, however, that global focal length adjustment cannot be done as part of the initial sequential mosaic creation stage, since this method presupposes that only the newest image is being adjusted. The issue of global focal length estimate refinement is addressed below in this specification.

The same methodology as presented above can be used to update any motion parameter p on which the image-to-image homography M(p) depends, e.g., the location of the optical center, the aspect ratio, etc. M is set to $$M \leftarrow M(p + \delta p) \approx \left(I + \delta p \frac{\partial M}{\partial p} M^{-1}\right) M \quad (24)$$

Hence, the entries in $\partial d/\partial p$ can be read from the entries in $(\partial M/\partial p)M^{-1}$.

PATCH-BASED ALIGNMENT METHOD:

The normal equations given in the previous section, together with an appropriately chosen Jacobian matrix, can be used to directly improve the current motion estimate by first computing local intensity errors and gradients, and then accumulating the entries in the residual vector b and Hessian matrix A. This straightforward method suffers from several drawbacks: it is susceptible to local minima and outliers, and is also unnecessarily inefficient. An implementation is now presented which is more robust and efficient.

The computational effort required to take a single gradient descent step in parameter space can be divided into three major parts: (i) the warping (resampling) $I_1(x')$ into $\tilde{I}_1(x)$, (ii) the computation of the local intensity errors $e_i$ and gradients $g_i$, and (iii) the accumulation of the entries in A and b. This last step can be quite burdensome, since it involves the computations of the monomials in $J_i$ and the formation of the products in A and b (equations (13) and (14)). Notice that equations (13) and (14) can be written as vector/matrix products of the Jacobian $J(x_i)$ with the gradient-weighted intensity errors $e_i g_i$ and the local intensity gradient $g_i g_i^T$. If the image is divided into little patches $P_j$, and make the approximation that $J(x_i)=J_j$ is constant within each patch (say by evaluating it at the patch center), the normal equations can be written as $$A \approx \sum_j J_j A_j J_j^T \quad \text{with} \quad A_j = \sum_{i \in P_j} g_i g_i^T \quad (25)$$

and $$b \approx \sum_j J_j b_j \quad \text{with} \quad b_j = \sum_{i \in P_j} e_i g_i \quad (26)$$

Here, $A_j$ and $b_j$ are the terms that appear in patch-based optical flow methods. The new method therefore augments step (ii) above with the accumulation of $A_j$ and $b_j$ (only 10 additional multiply/add operations, which could potentially be done using fixpoint arithmetic), and performs the computations required to evaluate $J_i$ and accumulate A and b only once per patch. A potential disadvantage of using this approximation is that it might lead to poorer convergence (more iterations) in the parameter estimation method. In practice, this has not been observed to be the case with the small patches (8-by-8).

Local Search:

Another limitation of straightforward gradient descent is that it can get trapped in local minima, especially when the initial misregistration is more than a few pixels. A useful heuristic for enlarging the region of convergence is to use a hierarchical or coarse-to-fine process, where estimates from coarser levels of the pyramid are used to initialize the registration at finer levels. This is a remarkably effective approach, and it is preferable to use 3 or 4 pyramid levels in the mosaic construction method. However, it may still sometimes fail if the amount of misregistration exceeds the scale at which significant image details exist (i.e., because these details may not exist or may be strongly aliased at coarse resolution levels). To help overcome this problem, a local search component is added to the registration method.

Before doing the first gradient descent step at a given resolution level, the process can be modified to perform an independent search at each patch for the integral shift which will best align the $I_0$ and $\tilde{I}_1$ images (This block-matching feature is the basis of most MPEG4 coding algorithms.) For a search range of ±s pixels both horizontally and vertically, this requires the evaluation of $(2s+)^2$ different shifts. For this reason, the local search method is typically applied only at the coarsest level of the pyramid. Once the displacements have been estimated for each patch, they must somehow be integrated into the global parameter estimation process. The easiest way to do this is to compute a new set of patch Hessians $A_j$ and patch residuals $b_j$ (equations (25) and (26)) to encode the results of the search. As disclosed in prior publications (e.g., Bergen et al., "Hierarchical model-based motion estimation", *Second European Conference on Computer Vision* 1992, pages 237–252, Santa Margherita Liguere, Italy, May 1992, Springer-Verlag), for patch-based flow processes, $A_j$ and $b_j$ describe a local error surface $$E(u_j) = u_j^T A_j u_j + 2 u_j^T b_j + c = (u_j - u_j^*)^T A_j (u_j - u_j^*) + c \quad (27)$$

where $$u_j^* = -A_j^{-1} b_j \quad (28)$$

is the minimum energy (optimal) flow estimate.

Two methods for computing $A_j$ and $b_j$ from the results of the local search will now be described. The first is to fit equation (27) to the discretely sampled error surface which was used to determine the best shift $u_0$. Since there are 5 free parameters in $A_j$ and $b_j$ ($A_j$ is symmetric), one can simply fit a bivariate quadratic surface to the central E value of equation (27) and its 4 nearest neighbors (more points can be used, if desired).

Note that this fit will implicitly localize the results of the local search to sub-pixel precision (because of the quadratic fit).

A second approach is to compute $A_j$ and $b_j$ using the gradient-based approach (equations (25) and (26)), but with image $\tilde{I}_1(x)$ shifted by the estimated amount $u_0$. After accumulating the new Hessian $\hat{A}_j$ and residual $\hat{b}_j$ with respect to the shifted image, the new gradient-based sub-pixel estimate can be computed as $$\hat{u}_j^* = -\hat{A}_j^{-1} \hat{b}_j. \quad (29)$$

Adding the result of equation 29 to the local search displacement, i.e., $$u_j^* = \hat{u}_j^* + u_0 \quad (30)$$

is equivalent to setting $$A_j = \hat{A}_j, \; b_j = \hat{b}_j - A_j u_0. \quad (31)$$

This second approach is preferred, since it results in $A_j$ estimates which are non-negative definite (an important feature for ensuring that the normal equations can be solved stably), and since it better reflects the certainty in a local match. (An analysis of these two approaches can be found in Tian et al., "Algorithms for subpixel registration", Computer Vision, Graphics and Image Processing, Vol. 35, pages 220–233, 1986.)

In the preferred approach, if the local search method returns a best displacement estimate of $u_0$, the intensity errors and gradients are evaluated at the shifted patch, the $A_j$ and $b_j$ quantities are computed as before, and the $b_j$ vector is then decremented by $A_j u_0$.

Termination Conditions:

A processor carrying out the alignment process must know how long to iterate at a given resolution (coarse/fine) level before proceeding to the next resolution level (or terminating the alignment process). Rather than looking at the energy (RMS intensity error), the average displacement between the old and new warped image locations is measured (in practice, the RMS displacement is measured at the image corners). This is an easier measure on which to set a threshold (a current implementation uses ¹⁄₁₆ of a pixel).

Downhill energy descent:

Because the method is to minimize a non-linear least squares problem, it is possible for an update to not actually go downhill in energy. If this occurs, the process preferably uses the previously computed parameter update vector, but halves the step size until either the energy has decreased or the termination condition is passed (very little movement).

Robustification:

Sometimes, the results of local patch-based alignment will be grossly erroneous (initial misregistration is too large, something has moved, image specularities, etc.). To compensate for this, the RMS errors associated with each patch are scanned to determine an overall (robust) RMS error for the image. Preferably, the process then down-weights the contributions from those patches whose RMS error significantly exceed the image RMS error estimate.

Figure 12:
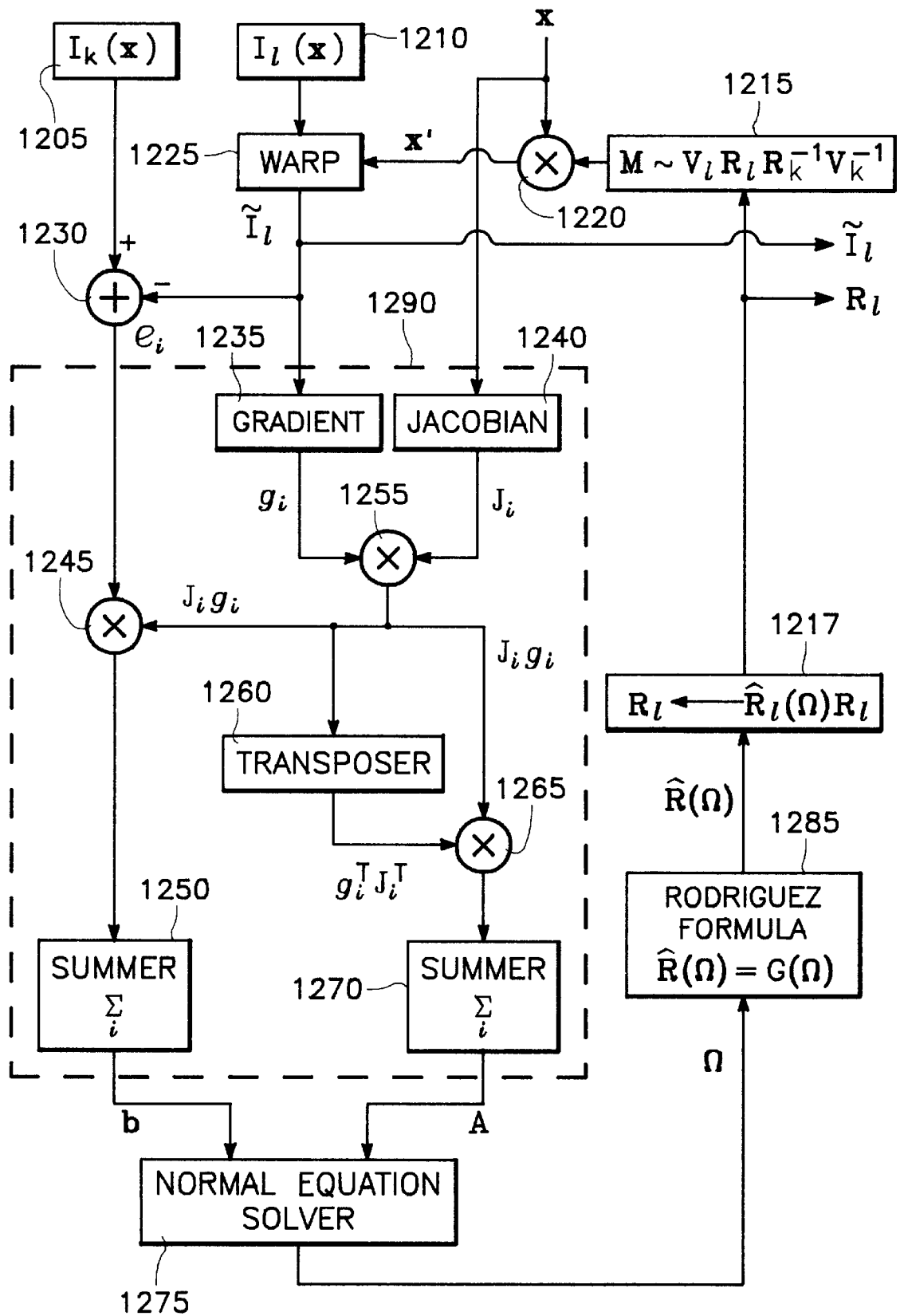
FIG. 12 is a block diagram illustrating the signal flow in the incremental 3D rotation alignment method of FIG. 11.
Figure 14:
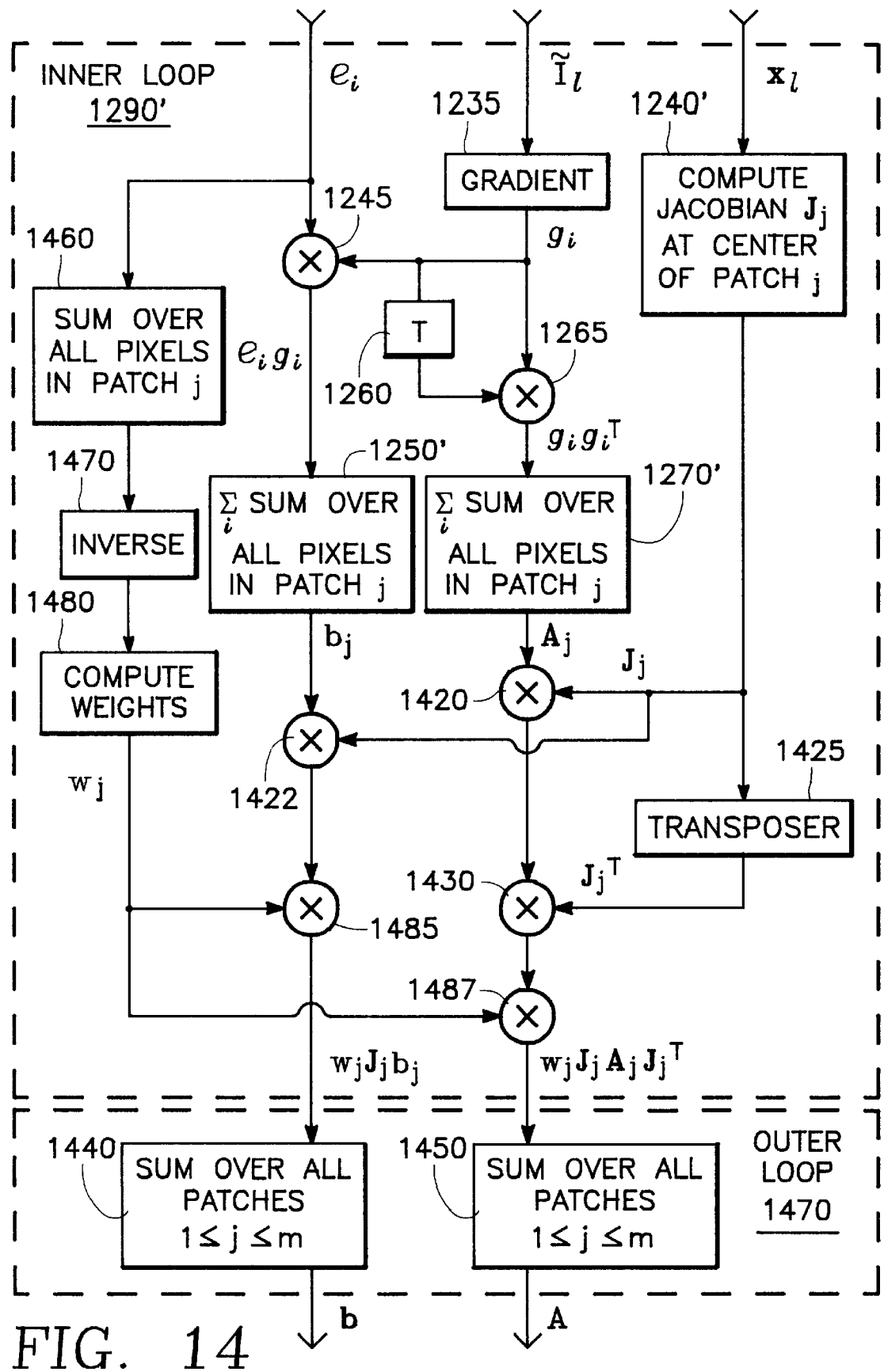
FIG. 14 is a signal flow diagram illustrating a modification of the signal flow of FIG. 11 for carrying out a patch-based alignment.

The patch based alignment method may be implemented by modifying the inner loop 1290 of the signal flow diagram of FIG. 12 in the manner illustrated in FIG. 14. Specifically, the inner loop 1290 is modified, first, by postponing the multiplication of the Jacobian matrix with the gradients until after the gradients have been summed by the summer 1270 (1270' in FIG. 14). Moreover, the Jacobian operator 1240' of FIG. 14 differs from the Jacobian operator of FIG. 12 in that in FIG. 14 the Jacobian operator only computes the Jacobian matrix once within each entire image patch, preferably evaluating the Jacobian matrix at the center of the patch. Furthermore, the summers 1250' and 1270' of FIG. 14 differ from their counterparts 1250 and 1270 in FIG. 12 in that in FIG. 14 these summers only sum over the pixels within the current image patch and then stop. For this purpose, the output of the summer 1270' of FIG. 14 is multiplied first by the patch Jacobian matrix by multiplier 1420 and then by the corresponding transpose by multiplier 1430. The resulting product is then summed over all patches by summer 1450 to produce A. Similarly, the output of summer 1250' is multiplied by the patch Jacobian matrix by a multiplier 1422 and the resulting product is summed over all patches by summer 1440 to produce b. Thus, the two summers 1440, 1450 constitute a separate patch loop 1470 that sums on a patch-by-patch basis while the remainder of the inner loop operates on all pixels within a given patch.

The robustification feature referred to above is carried out, in one embodiment, by an error summer 1460 which adds all the errors for a given patch, and a divider 1470 which takes the reciprocal of the sum of the errors and a weighter 1480 which computes a weight (a fractional number) based upon the reciprocal of the error sum. Such a weight is applied to de-weight the outputs of the patch adders 1250' and 1270' at de-weight multipliers 1485, 1487.

GLOBAL ALIGNMENT BLOCK ADJUSTMENT:

The sequential mosaic construction method described above in this specification does a good job of aligning each new image with the previously composited mosaic. Unfortunately, for long image sequences, this approach suffers from the problem of accumulated misregistration errors. This problem is particularly severe for panoramic mosaics, where a visible "gap" (or "overlap") will exist between the first and last images in a sequence, even if these two images are the same. This problem can arise in cylindrical, perspective, or rotational panoramic representations.

The Problem of Closing the Gap:

Even with the best methods for recovering rotations and focal length, when a complete panoramic sequence is stitched together, there will invariably be either a gap or an overlap (due to accumulated errors in the rotation estimates). One approach to this problem is to register the same image at both the beginning and the end of the sequence. The difference in the rotation matrices (actually, their quotient) directly tells us the amount of misregistration. This error can then be distributed evenly across the whole sequence by converting the error in rotation into a quaternion, and dividing the quaternion by the number of images in the sequence (for lack of a better guess). The process can also update the estimated focal length based on the amount of misregistration. To do this, the process first converts the quaternion describing the misregistration into a gap angle $\theta_g$. The process can then update the focal length using the equation $$f' = \frac{360° - \theta_g}{360°} f.$$

This method, however, only works with a pure panning sequence, a significant limitation.

A global alignment method is now described that reduces accumulated error by simultaneously minimizing the misregistration between all overlapping pairs of images. The method is an improvement over the "simultaneous bundle block adjustment" technique used in photogrammetry but has the following distinct characteristics:

(1) Corresponding points between pairs of images are automatically obtained using patch-based alignment.

(2) The objective function minimizes the difference between ray directions going through corresponding points, and uses a rotational panoramic representation.

(3) The minimization is formulated as a constrained least-squares problem with hard linear constraints for identical focal lengths and repeated frames. (It has been found that it is easier to use certain frames in the sequence more than once during the sequential mosaic formation process— say at the beginning and at the end—and to then use the global alignment method to make sure that these all have the same associated location.)

Establishing The Point Correspondences:

The global alignment method is a feature-based method, i.e., it relies on first establishing point correspondences between overlapping images, rather than doing direct intensity difference minimization (as in the sequential method). To find the features, the method divides each image into a number of patches (e.g., 16–by–16 pixels), and uses the patch centers as prospective "feature" points. For each patch center in image $I_l$, its corresponding point in another image $I_k$ could be determined directly by the current interframe transformation $M_k M_l^{-1}$. However, since these alignments are probably not optimal, it is better instead to invoke the local search-based patch alignment method described previously in this specification. (The results of this patch-based alignment are also used for the deghosting method discussed later in this specification.) Pairs of images are examined only if they have significant overlap, for example, more than a quarter of the image size. In addition, instead of using all patch centers, the process selects only those with high confidence (or low uncertainty) measure. It is preferred to set the threshold for the minimum eigenvalue of each 2-by-2 patch Hessian (available from the patch-based alignment process) so that patches with uniform texture are excluded. Other measures such as the ratio between two eigenvalues can also be used so that patches where the aperture problem exists can be ignored. Raw intensity error, however, would not make a useful measure for selecting feature patches because of potentially large interframe intensity variations (varying exposures, vignetting, etc.).

Optimality Criteria:

For a patch j in image $I_k$, let $I_l$ be an image in the set $N_{jk}$ of overlapping images in which patch j is totally contained (under the current set of transformations). Let $x_{jk}$ be the center of this patch. To compute the patch alignment, the process uses image $I_k$ as $I_0$ and image $I_l$ as $I1$ and invokes the local search method described above in this specification, which returns an estimated displacement $u_{jl} = u_j^*$. The corresponding point in the warped image $\tilde{I}_1$ is thus $$\tilde{x}_{jl} = x_{jk} + u_{jl}.$$

In image $I_1$, this point's coordinate is $$x_{jl} \sim M_l M_k^{-1} \tilde{x}_{jl},$$

or ti $x_{jl} = V_l R_l R_k^{-1} V_k^{-1} \tilde{x}_{jl}$ if the rotational panoramic representation is used.

Figure 15:
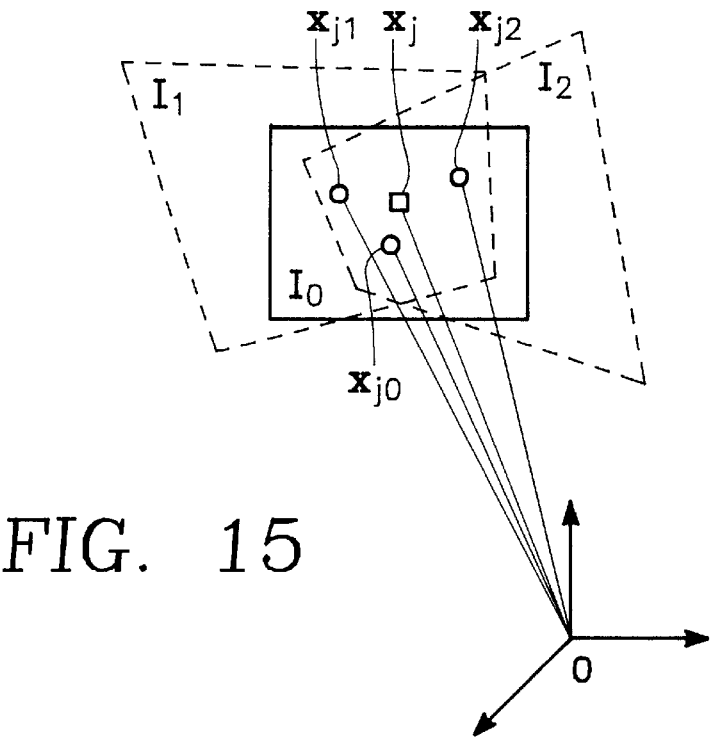
FIG. 15 illustrates adjustment of a bundle of direction rays in accordance with a first approach to a global block alignment method.

Given these point correspondences, one way to formulate the global alignment is to minimize the difference between screen coordinates of all overlapping pairs of images, $$E(\{M_k\}) = \sum_{j,k,l \in N_{jk}} \|x_{jk} - P(M_k M_l^{-1} x_{jl})\|^2 \quad (32)$$

where $P(M_k M_l^{-1} x_{jl})$ is the projected screen coordinate of $x_{jl}$ under the transformation $M_k M_l^{-1}$. (Each $M_k$ could be a general homography, or could be based on the rotational panoramic representation). This has the advantage of being able to incorporate local certainties in the point matches (by making the above norm be a matrix norm based on the local Hessian $A_{jk}$). The disadvantage, however, is that the gradients with respect to the motion parameters are complicated. A simpler formulation can be obtained by minimizing the difference between the ray directions of corresponding points using a rotational panoramic representation with unknown focal length. Geometrically, this is equivalent to adjusting the rotation and focal length for each frame so that the bundle of corresponding rays converge, as shown in FIG. 15. FIG. 15 shows the adjustment of the bundle of rays $x_{jk}$ so that they converge to $x_j$. Let the ray direction in the final composited image mosaic be a unit vector $p_j$, and its corresponding ray direction in the kth frame be $p_{jk} \sim R_k^{-1} V_k^{-1} x_{jk}$. The block adjustment method can be formulated to simultaneously optimize over both the pose (rotation and focal length $R_k, f_k$) and structure (ray direction $p_j$) parameters, $$E(\{R_k, f_k\}, \{p_k\}) = \sum_{j,k} \|p_{jk} - p_j\|^2 = \sum_{j,k} \|R_k^{-1} \hat{x}_{jk} - p_j\|^2 \quad (33)$$

where $$\hat{x}_{jk} = \begin{bmatrix} x_{jk} \\ y_{jk} \\ f_k \end{bmatrix} / l_{jk} \quad (34)$$

is the ray direction going through the $j^{th}$ feature point located at $x_{jk}, y_{jk}$ in the $k^{th}$ frame, and $$l_{jk} = \sqrt{x_{jk}^2 + y_{jk}^2 + f_k^2} \quad (35)$$

(Equation (35) absorbs the $f_k$ parameter in $V_k$ into the coordinate definition.) The method set forth here with reference to Equation 33 has been described with reference to an implementation in which the deformation is carried out by three-dimensional rotations $R_k$. However, the same method may be carried out with any type of deformation $M_k$, such as the planar perspective deformation of Equation 2. In this case, in equations such as Equation 33, the term $R_k$ is replaced by $M_k$ throughout the equation and in equations such as Equation 34, the focal length $f_k$ is replaced by 1.

The advantage of the above direct minimization (equation (33)) is that both pose and structure can be solved independently for each frame. For instance, one can solve for $p_j$ using linear least-squares, $R_k$ using relative orientation, and $f_k$ using nonlinear least-squares. The disadvantage of this method is its slow convergence due to the highly coupled nature of the equations and unknowns. (Imagine a chain of spring-connected masses. If we pull one end sharply, and then set each mass to the average of its neighbors, it will take the process a long time to reach equilibrium. This situation is analogous.) For the purpose of global alignment, however, it is not necessary to explicitly recover the ray directions. The block adjustment method can be reformulated to only minimize over pose ($R_k, f_k$) for all frames $I_k$, without computing the ray directions $p_j$. More specifically, the pose is estimated by minimizing the difference in ray directions between all pairs of overlapping images $I_k, I_l$, $$E(\{R_k, f_k\}) = \sum_{j,k,l \in N_{jk}} \|p_{jk} - p_{jl}\|^2 = \sum_{j,k,l \in N_{jk}} \|R_k^{-1} \hat{x}_{jk} - R_l^{-1} \hat{x}_{jl}\|^2 \quad (36)$$

Figure 16:
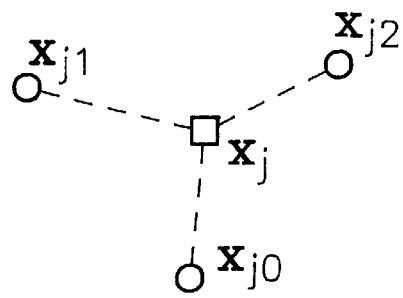
FIG. 16 illustrates adjustment of a bundle of direction rays in accordance with a second approach (corresponding to Equation 33 below) to the global block alignment method.
Figure 17:
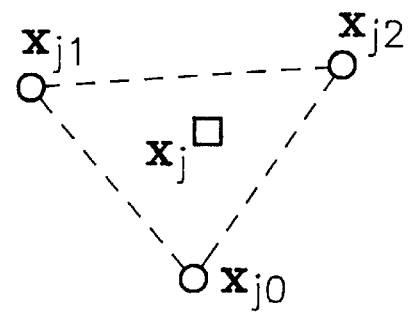
FIG. 17 illustrates pair-wise adjustment of a bundle of direction rays in accordance with the preferred embodiment (corresponding to Equation 36 below) of the global block adjustment method.

In the foregoing equation, the index k refers to the image that is divided into patches, the index j refers to the particular patch and the index l refers to the images overlapping image k. Once the pose has been computed, the estimated ray directions $p_j$ can be computed using the known correspondence from all overlapping frames $N_{jk}$ where the feature point or patch center of patch j is visible, $$p_j \sim \frac{1}{n_{jk}+1} \sum_{j \in N_{jk} \cup k} R_l^{-1} V_l^{-1} x_{jl} \quad (37)$$

where $n_{jk}$ is the number of overlapping images in the set of overlapping images $N_{jk}$ where the patch j is completely visible. FIG. 16 illustrates the first formulation (Equation 33) in which the distance to the consensus direction $x_j$ is minimized while FIG. 17 illustrates the preferred formulation (Equation 36) in which the difference between ray directions of image pairs are minimized.

Block Adjustment Solution Method:

The least-squares problem of equation (36) can be solved using the gradient descent method described previously in this specification. To recover the pose $R_k$, $f_k$, the process iteratively updates the ray directions $p_{jk}(x_{jk}, R_k, f_k)$ to:

$$p_{jk}(x_{jk};(I+X(\Omega_k))R_k, f_k+\delta f_k).$$

The terms of Equation 38 are computed by solving the normal equations, whose formation is discussed below. The minimization problem (equation 36) can be rewritten as $$E(\{R_k, f_k\}) = \sum_{j,k,l \in N_{jk}} \|H_{jk} y_{jk} - H_l y_l + e_{jkl}\|^2 \quad (39)$$

where $$e_{jkl} = p_{jk} - p_{jl},$$

$$y_k = \begin{bmatrix} \Omega_k \\ \delta f_k \end{bmatrix},$$

$$H_{jk} = \begin{bmatrix} \partial p_{jk}/\partial \Omega_k \\ \partial p_{jk}/\partial f_k \end{bmatrix},$$

and $$\frac{\partial p_{jk}}{\partial \Omega_k} = \frac{\partial (I-X(\Omega))p_{jk}}{\partial \Omega_k} = \frac{\partial}{\partial \Omega_k} \begin{bmatrix} 1 & \omega_z & -\omega_y \\ -\omega_z & 1 & \omega_x \\ \omega_y & -\omega_x & 1 \end{bmatrix} p_{jk} \quad (40)$$

$$= X(p_{jk}),$$

$$\frac{\partial p_{jk}}{\partial f_k} = R_k^{-1} \frac{\partial \tilde{x}_{jk}}{\partial f_k} = R_k^{-1} \begin{bmatrix} -x_{jk} f_k \\ -y_{jk} f_k \\ l_{jk}^2 - f_k^2 \end{bmatrix} / l_{jk}^3 \quad (41)$$

The normal equations can be formed directly from equation (39), updating four different subblocks of A and two different subvectors of b for each patch correspondence. Because A is symmetric, the normal equations can be stably solved using a symmetric positive definite (SPD) linear system solver. The result is $\delta f_k$ and $\Omega_k$. The correct focal length is then obtained by adding $\delta f_k + f_k$, and the focal length scaling matrix V is formed from $f_k$ as defined at Equation 15 above. However, the focal length scaling matrix is only required if the rotational deformation matrix R is being used instead of a planar perspective deformation M. The block adjustment method has been described above with reference to an implementation employing the rotational deformation R but may as well be implemented using another deformation M such as a planar perspective deformation instead of R. In fact, in the foregoing equations (Equations 38–41), M may be substituted for R provided $f_k$ in Equation 34 is changed to 1, as described previously herein. M may be any suitable deformation, such as a planar perspective deformation.

Depending upon whether the focal lengths are known or not, there are three possible cases for this minimization:

(1) 4N unknowns: the focal lengths are unknown and different for all frames;

(2) 3N+1 unknowns: the focal lengths are the same but unknown;

(3) 3N unknowns: all focal lengths are known.

By incorporating additional constraints on the pose, the minimization problem (equation (36)) can be formulated as a constrained least-squares problem which can be solved using Lagrange multipliers, as described in Press et al., *Numerical Recipes in C: The Art of scientific Computing*, Cambridge University Press, Cambridge, England, 2nd edition, 1992. Possible linear constraints include:

(1) $\Omega_0 = 0$. The pose of the first frame is unchanged. For example, the first frame can be chosen as the world coordinate system.

(2) $\delta f_k = 0$ for all N frames. All focal lengths are known.

(3) $\delta f_k = \delta f_0$ for all k. All focal lengths are the same but unknown.

(4) $\delta f_k = \delta f_j$ and $\Omega_k = \Omega_j$, Frame j is the same as frame k. In order to apply this constraint, it is necessary to set $f_k = f_l$ and $R_k = R_l$.

The above minimization process converges quickly (several iterations) in practice. The running time for the iterative non-linear least-squares solver is much less than the time required to build the point correspondences.

Figure 18:
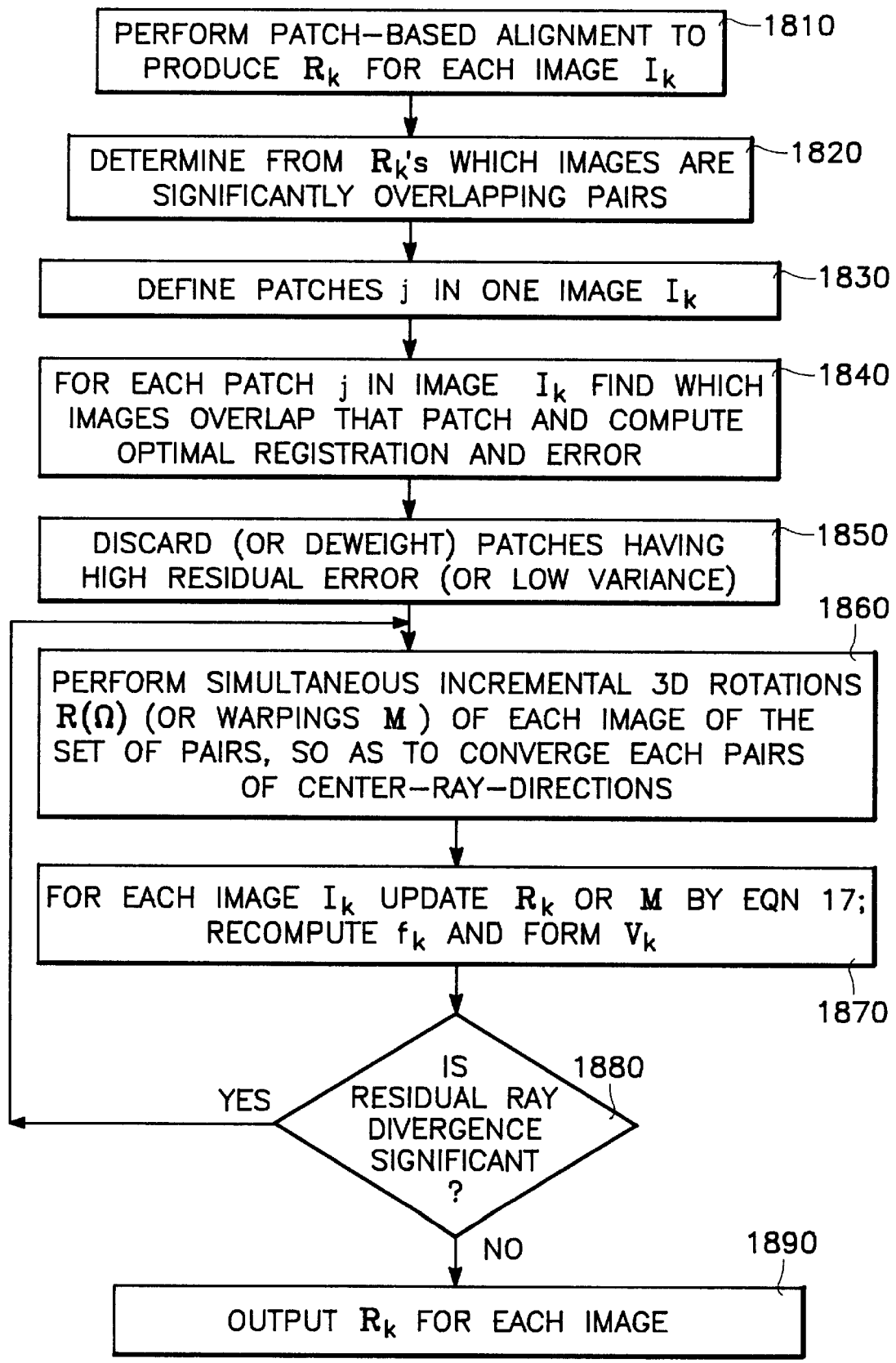
FIG. 18 is a flow diagram illustrating the global block adjustment method.

The foregoing global alignment method is illustrated in FIG. 18. In step 1810, patch-based alignment (FIG. 14) is performed to produce a rotation matrix for each image. From the rotation matrices, the amount of overlap of the various images may be determined so that all pairs of overlapping images are identified in step 1820. A given image is divided into patches (step 1830) and all other images overlapping a given patch are defined (step 1840). The patched image is thus paired with each one of the other images that overlaps the particular patch, thus forming a set of image pairs. The center of the particular patch defining one ray direction is matched with a corresponding pixel in each image overlapping the patch defining another ray direction, the two ray directions forming a pair of ray directions. The robustification feature described with reference to FIG. 14 may be employed to discount or discard unreliable patches (step 1850). Then, the method performs simultaneous incremental 3D rotations of all images so as to converge each pair of ray directions (step 1860). The resulting incremental rotations are used to update the rotational orientation matrix of each image in the set, preferably using Equation 18 (step 1870). Also, the focal lengths are recomputed from Equations 40 and 41 as mentioned above to form an updated focal length scaling matrix. Provided that the ray divergences remain above a predetermined threshold (YES branch of block 1880), the simultaneous incremental rotations of step 1860 are repeated and the process loops to steps 1870 and 1880 until the ray divergences fall below the threshold (NO branch of block 1880) at which point the latest version of the rotation orientation matrices are stored or output (step 1890). It should be reiterated that the present description has been made in terms of a rotational deformation R but the block adjustment method described may use another type of deformation M instead of R.

DEGHOSTING (LOCAL ALIGNMENT) METHOD:

After the global alignment has been run, there may still be localized misregistrations present in the image mosaic, due to deviations from the idealized parallax-free camera model. Such deviations might include camera translation (especially for hand-held cameras), radial distortion, the mis-location of the optical center (which can be significant for scanned photographs or Photo CDs), and moving objects. To compensate for these effects, it would be desirable to quantify the amount of mis-registration and to then locally warp each image so that the overall mosaic does not contain visible ghosting (double images) or blurred details. If the mosaic contains just a few images, the process could choose one image as the base, and then compute the optical flow between it and all other images, which could then be deformed to match the base. Another possibility would be to explicitly estimate the camera motion and residual parallax, but this would not compensate for other distortions.

However, large image mosaics are to be constructed, what is needed is an approach which makes all of the images globally consistent, without a preferred base. One approach might be to warp each image so that it best matches the current mosaic. For small amounts of misregistration, where most of the visual effects are simple blurring (loss of detail), this should work fairly well. However, for large misregistrations, where ghosting is present, the local motion estimation would likely fail.

These problems are solved by a deghosting method which computes the flow between all pairs of images, and then infers the desired local warps from these computations. While in principle, any motion estimation or optical flow technique could be used, it is preferable to use the patch-based alignment method described above in this specification, since it provides the required information and allows us to reason about geometric consistency. Recall that the block adjustment method described immediately above provides an estimate $p_j$ of the true direction in space corresponding to the $j^{th}$ patch center in the $k^{th}$ image, $x_{jk}$. The projection of this direction onto the $k^{th}$ image is $$x_{jk} \sim V_k R_k \frac{1}{n_{jk}+1} \sum_{l \in N_{jk} \cup k} R_l^{-1} V_l^{-1} x_{jl} = \frac{1}{n_{jk}+1}\left( x_{jk} + \sum_{l \in N_{jk}} \tilde{x}_{jl} \right). \quad (42)$$

This can be converted into a motion estimate $$\overline{u}_{jk} = \overline{x}_{jk} - x_{jk} = \frac{1}{n_{jk}+1} \sum_{l \in N_{jk}} (\tilde{x}_{jl} - x_{jl}) = \frac{1}{n_{jk}+1} \sum_{l \in N_{jk}} u_{jl} \quad (43)$$

Figure 19:
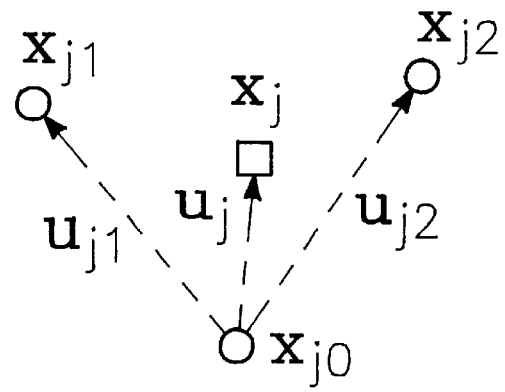
FIG. 19 illustrates pair-wise motion estimation between pixels and average motion computation in accordance with a deghosting method.

This formula underlies the method for deghosting and has the following explanation. Referring to FIG. 19, the local motion required to bring the $j^{th}$ patch center in the $k^{th}$ image into global registration is simply the average of the pairwise motion estimates with all overlapping images, normalized by the fraction $n_{jk}/(n_{jk}+1)$. This normalization factor prevents local motion estimates from "overshooting" in their corrections. (Consider, for example, just two images, where each image warps itself to match its neighbor). Thus, the location motion estimate can be computed for each image by simply examining its misregistration with its neighbors, without having to worry about what warps these other neighbors might be undergoing themselves.

One advantage of the deghosting method of Equation 43 is that it works for any alignment model or deformation chosen by the user. For example, in Equation 42, the rotational deformation or model R is employed, but this term drops out in the final calculation of the projection (i.e., in the right hand side of Equation 42). Thus, the final result or formula for deghosting applies to any motion model chosen by the user such as a rotational warp R or planar perspective warp M, a significant advantage. Therefore, this method can be employed using planar perspective, rotational or any suitable motion model.

Inverse Mapping The Warp:

Once the local motion estimates have been computed, it is necessary to warp each image so as to reduce ghosting. One possibility would be to use a forward mapping method to convert each image $I_k$ into a new image $\hat{I}_k$. However, this has the disadvantage of being expensive to compute, and of being susceptible to tears and Holdovers. Instead, the system employs an inverse mapping method which will now be disclosed. For each pixel in the new (warped) image $\hat{I}_k$, it is necessary to find the relative distance (flow) to the appro-priate source pixel. This field is computed using a sparse data interpolation technique. The input to this process is the set of negative flows—$\overline{u}_{jk}$ located at pixel coordinates $\overline{x}_{jk}=x_{jk}+\overline{u}_{jk}$. In accordance with a current implementation, a tent (bilinear) function is placed over each flow sample (the size is currently selected to be twice the patch size). To make this interpolator locally reproducible (no "dips" in the interpolated surface), each accumulated flow value is divided by the accumulated weight (plus a small amount, say 0.1, to round the transitions into regions with no motion estimates). Note that since the deghosting method may not give perfect results (because it is patch-based, and not pixel-based), it may be desirable to iteratively apply the deghosting method (in which case the warping field is incrementally updated).

Figure 20:
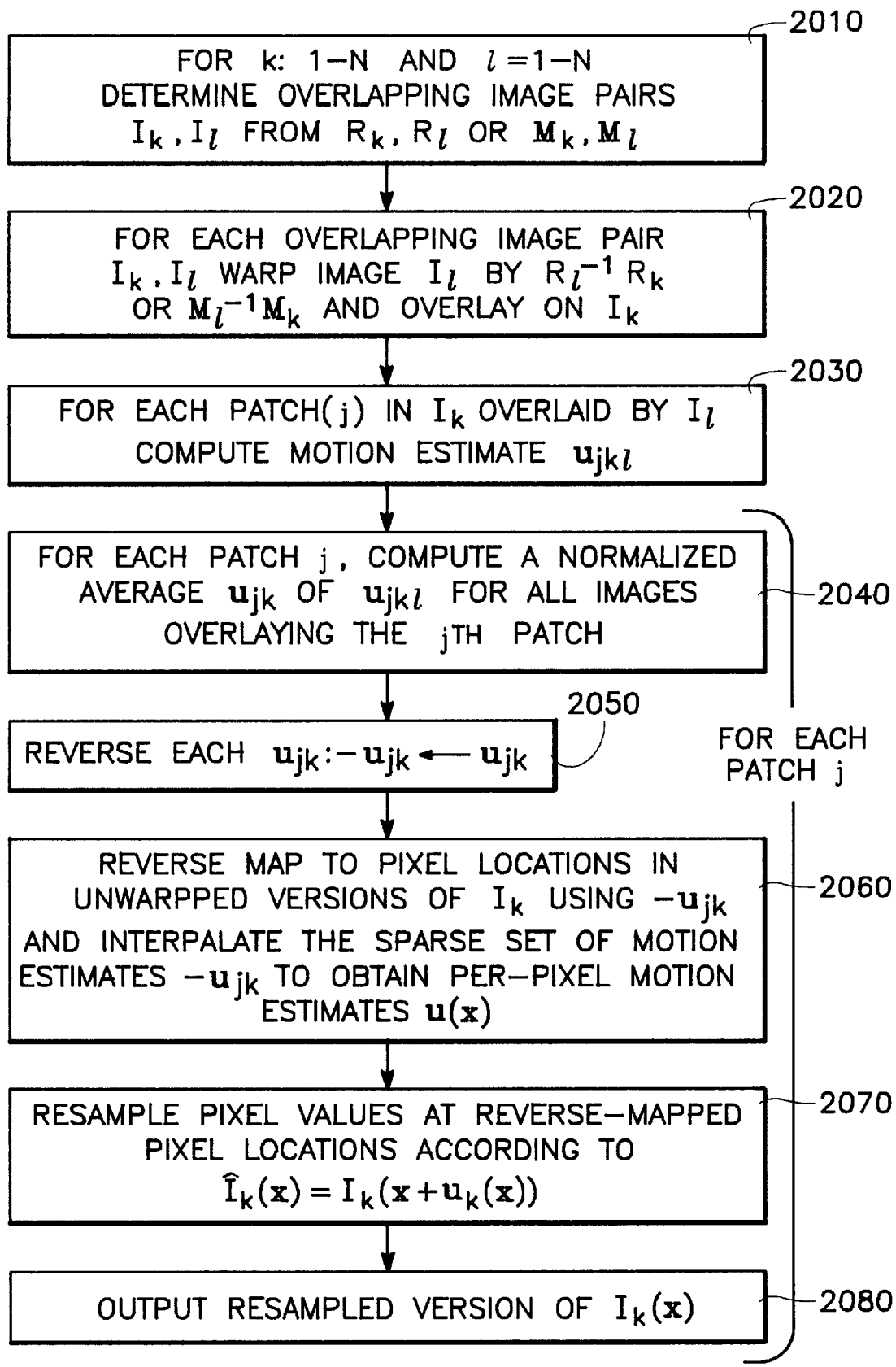
FIG. 20 is a flow diagram illustrating a preferred embodiment of the deghosting method.
Figure 24:
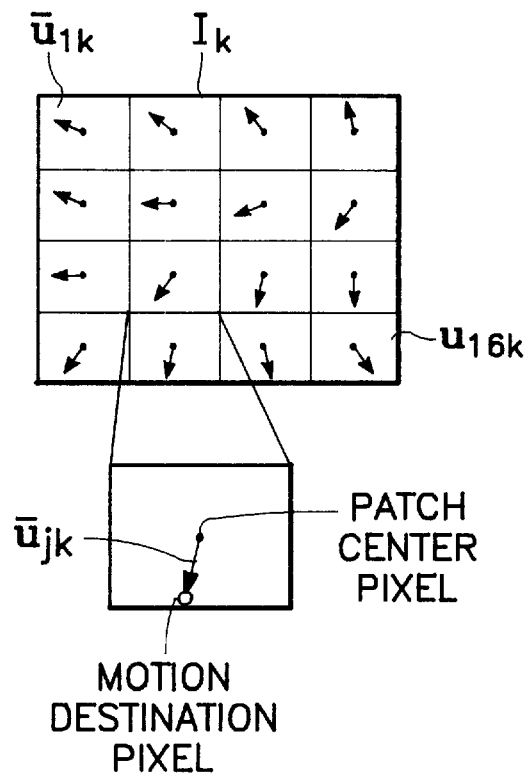
FIG. 24 illustrates an array of patch-based motion estimates in accordance with the deghosting method.
Figure 25A:
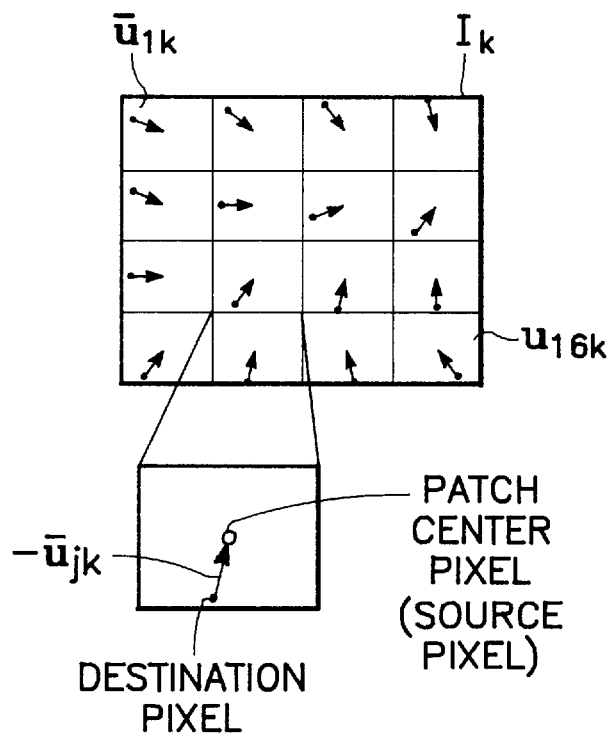
FIG. 25A illustrates an inverse mapping method in accordance with a preferred embodiment of the deghosting method in which per-patch motion estimates are obtained.
Figure 25B:
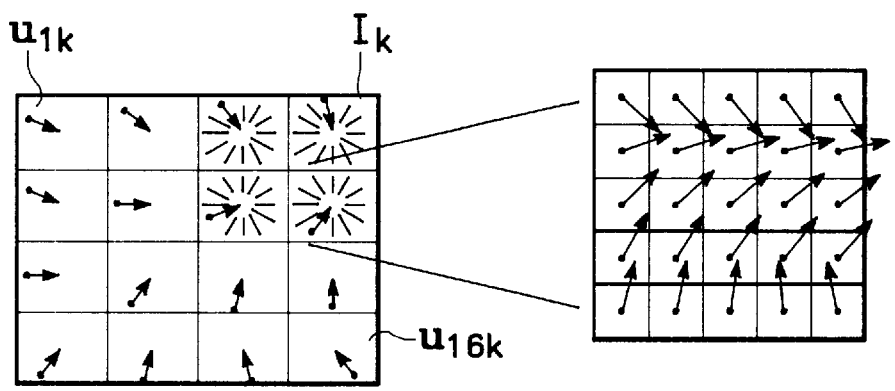
FIG. 25B illustrates how the per-patch motion estimates are interpolated to produce a finer grid of per-pixel motion estimates.

The deghosting method is illustrated in FIG. 20. As in the global alignment method, the image orientation matrices obtained by the patch-based alignment method are used to determine which pairs of images overlap (step 2010). For a given image, its overlapping mates are each warped in accordance with the appropriate rotation matrices and overlaid on the given image (step 2020). Note that since this step is carried out for all images, each image of an overlapping pair will be warped to the other in separate iterations of the process, as depicted in FIGS. 21 and 22. Then, for each patch in the given image, a pair-wise image motion estimate is computed which tends to improve pair-wise registration (step 2030). The pair-wise motion estimates are combined in a normalized average for each patch (step 2040). As illustrated in FIG. 23, overlaying two different images on a given image provides two different motion estimates (vectors) whose weighted average is a vector having a direction lying between the directions of the vectors corresponding to the two motion estimates. The result for the entire image is illustrated in FIG. 24, in which an averaged motion vector is associated with each patch. The averaged motion vector for each patch is then used to form a reverse motion vector (step 2050) and the reverse motion vector is employed to map source pixels in the unwarped image to destination pixel locations (step 2060). The result of this last step is illustrated in FIG. 25A, in which each patch is now associated with an inverse motion estimate vector pointing from a source pixel in the image to a destination pixel location. Since the destination pixel locations are not regularly and densely sampled, a sparse data interpolation technique is employed to interpolate the sparse (per-patch) inverse motion estimate vectors—$\overline{u}_{jk}$ to obtain interpolated per-pixel motion estimates $u_k(X)$. The per-pixel motion estimates are then used as a mapping from source pixels to destination pixels as illustrated in FIG. 25B. This mapping is used to resample the pixels at the reverse-mapped pixel locations (step 2070). In other words, the values (colors or shade) of the source pixels are placed at the destination pixel locations in accordance with $$\hat{I}_k(x)=I_k(x+u_k(x)).$$

Preferably, a weighted sparse data interpolation technique is employed, such as that described in Nielson, "Scattered Data Modeling", *IEEE Computer Graphics and Applications,* Vol. 13, No. 1, pages 60–70, January, 1993. As illustrated in FIG. 25B, the contributions of motion estimates of adjacent patches to each per-pixel motion estimate are weighted in accordance to their proximity to the pixel, so that a smooth transition between adjacent patches having different per-patch motion estimates can be observed in the per-pixel motion estimates of FIG. 25B.

Figure 26:
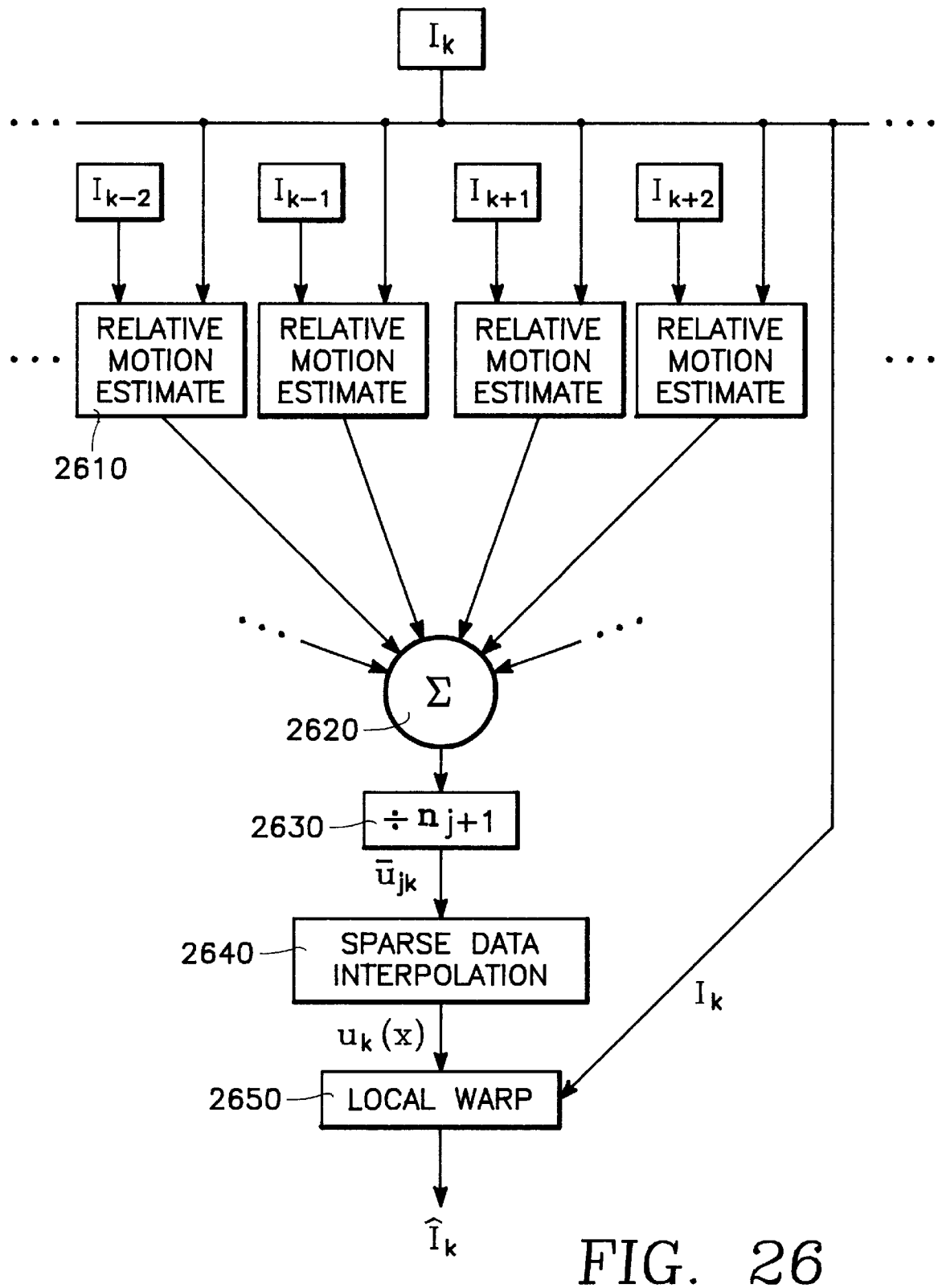
FIG. 26 is a signal flow diagram corresponding to one embodiment for carrying out the deghosting method.

FIG. 26 illustrates a signal processing representation of the deghosting method. A set of pair-wise motion estimators 2610 compute motion estimates between pairs of images. A set of adders 2620 and dividers 2630 combine the pair-wise motion estimates from the motion estimators 2610 in a normalized average. Each adder 2620 sums motion estimates from those motion estimators 2610 responding to images overlaying the image processed by the particular adder 2620. Each divider 2630 divides the sum computed by the corresponding adder 2620 by the normalization factor of Equation 43 to produce the normalized average $\bar{u}_{jk}$ of the pair-wise motion estimates for each patch j in each image k. A sparse data interpolator 2640 interpolates the per-patch motion estimates to produce a motion estimate for each pixel, $u_k(x)$. A local warp operator 2650 resamples the image in accordance with $\hat{I}_k(x)=I_k(x+u_k(x))$.

ENVIRONMENT AND TEXTURE MAP CONSTRUCTION:

Once a complete panoramic mosaic has been constructed, it is necessary to convert the set of input images and associated transforms into one or more images which can be quickly rendered or viewed. A traditional way to do this is to choose either a cylindrical or spherical map. When being used as an environment map, such a representation is sometimes called a latitude-longitude projection. The color associated with each pixel is computed by first converting the pixel address to a 3D ray, and then mapping this ray into each input image through the known transformation. The colors picked up from each image are then blended using the weighting function (feathering) described earlier. For example, one can convert the rotational panorama to spherical panorama using the following method:

(1) for each pixel ($\theta$, $\phi$) in the spherical map, compute its corresponding 3D position on unit sphere p=(X,Y,Z) where X=cos($\phi$)sin($\theta$), Y=sin($\phi$), and Z=cos($\phi$)cos($\theta$);

(2) for each p, determine its mapping into each image k using $x \sim T_k V_k R_k p$;

(3) form a composite(blended) image from the above warped images.

Unfortunately, such a map requires a specialized viewer, and thus cannot take advantage of any texture-mapping acceleration hardware (without approximating the cylinder's or sphere's shape with a polyhedron, which would introduce distortions into the rendering). For true full-view panoramas, spherical maps also introduce a distortion around each pole.

In order to solve such problems, the process described here supports the use of traditional texture-mapped models, i.e., environment maps. The shape of the model and the embedding of each face into texture space are left up to the user. This choice can range from something as simple as a cube with six separate texture maps, to something as complicated as a subdivided dodecahedron, or even a latitude-longitude tessellated globe. (This latter representation is equivalent to a spherical map in the limit as the globe facets become infinitesimally small. The important difference is that even with large facets, an exact rendering can be obtained with regular texture-mapping methods and hardware.) This choice will depend on the characteristics of the rendering hardware and the desired quality (e.g., minimizing distortions or local changes in pixel size), and on external considerations such as the ease of painting on the resulting texture maps (since some embeddings may leave gaps in the texture map).

A method for efficiently computing texture map color values for any geometry and choice of texture map coordinates is now described. A generalization of this method can be used to project a collection of images onto an arbitrary model, e.g., non-convex models which do not surround the viewer.

Figure 27:
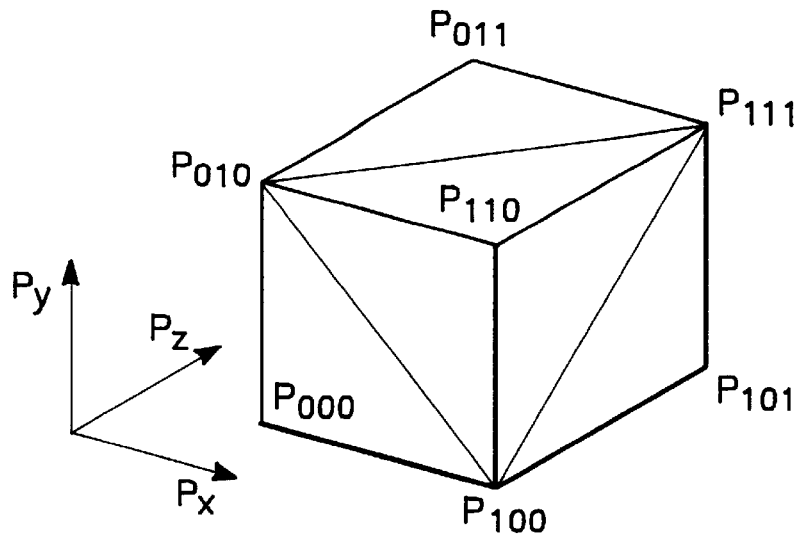
FIGS. 27 and 28 illustrate a cubic 3D model and corresponding 2D texture map for carrying out one embodiment of a texture mapping method.
Figure 28:
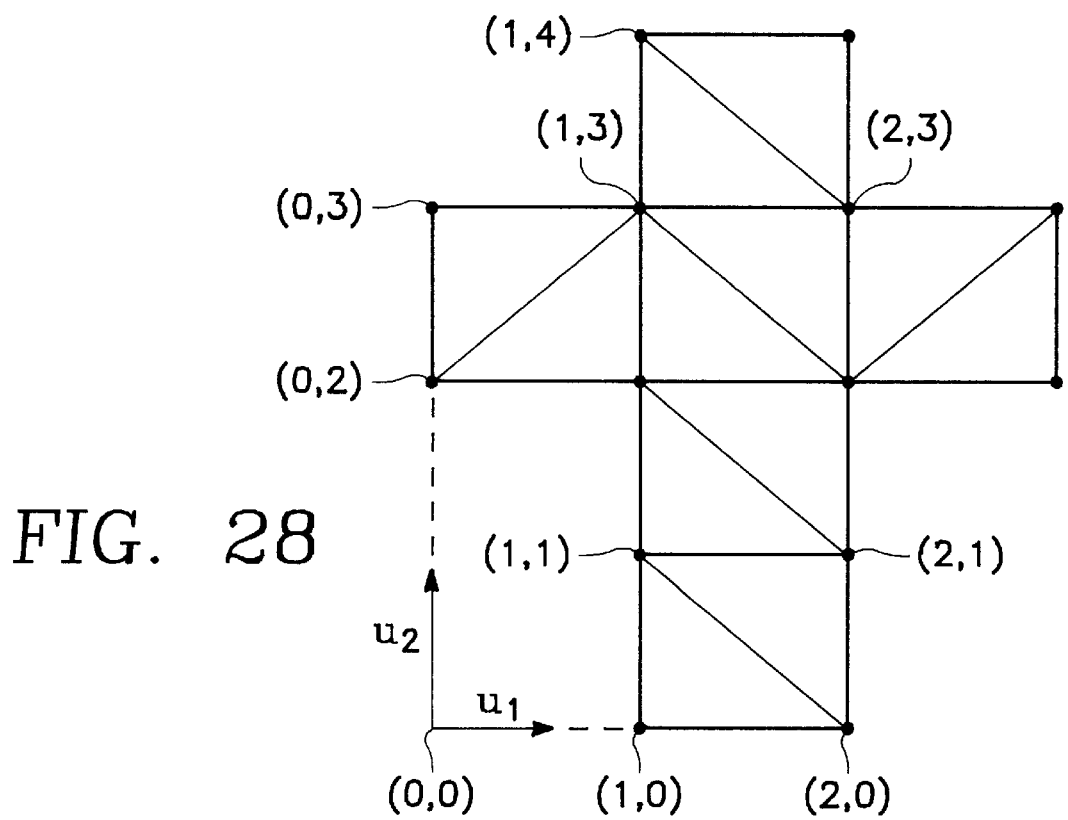
Figure 29:
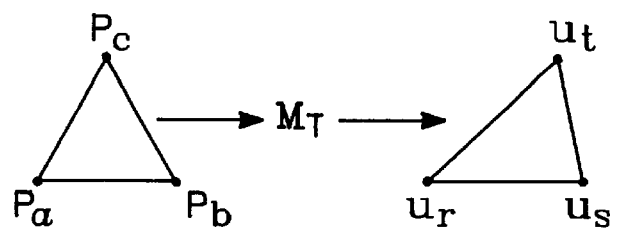
FIG. 29 illustrates a mapping between triangular vertices of a 3D model and a 2D texture map employed in carrying out one embodiment of the texture mapping.
Figure 31:
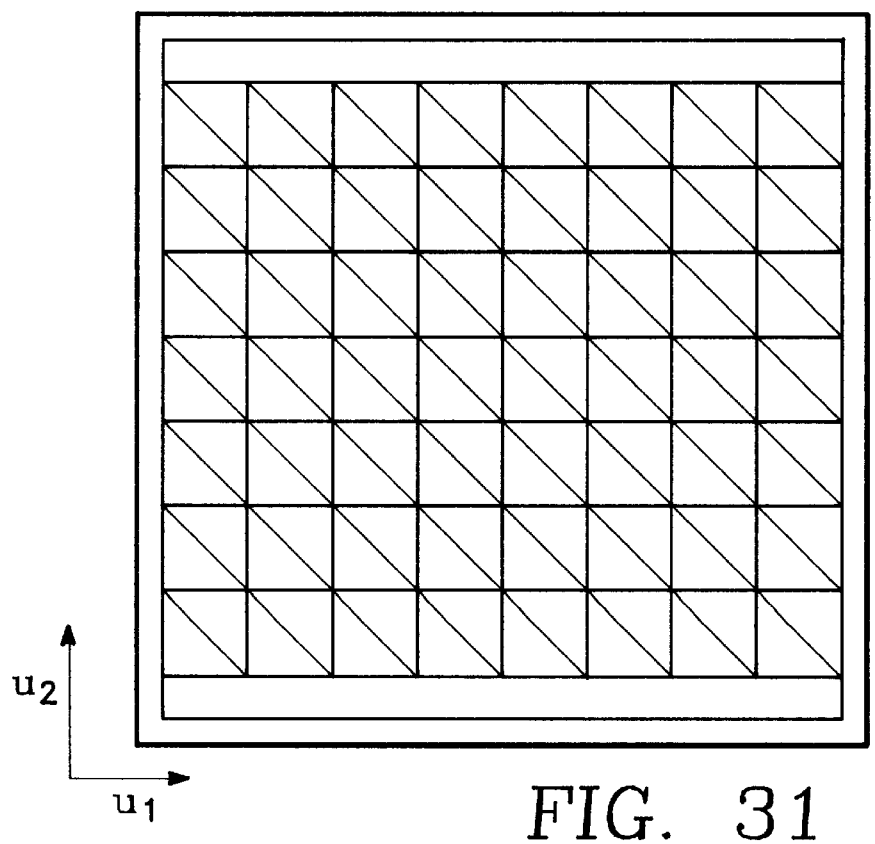

It is assumed that the object model is a triangulated surface, i.e., a collection of triangles and vertices, where each vertex is tagged with its 3D (X,Y,Z) coordinates and 2D (u, v) texture coordinates (faces may be assigned to different texture maps). Preferably, the model is restricted to triangular faces in order to obtain a simple, closed-form solution (perspective map, potentially different for each triangle) between texture coordinates and image coordinates. The output of the method is a set of colored texture maps, with undefined (invisible) pixels flagged (e.g., if an alpha channel is used, then $\alpha$=0 for invisible pixels). FIGS. 27 and 28 illustrate the case of a cubic 3D model and a texture map corresponding to a planar unfolding of the cube. FIG. 29 illustrates the mapping between vertices of the cube of FIG. 27 and vertices of the texture map of FIG. 28. FIG. illustrates a tessellated globe and FIG. 31 illustrates the texture map of the globe corresponding to a Mercator projection.

The method consists of the following four steps:

(1) Paint each triangle in (u,v) space a unique arbitrary pseudocolor;

(2) for each triangle, determine its (u,v,1)–to–(X,Y,Z) mapping;

(3) for each triangle, form a composite (blended) image;

(4) paint the composite image into the final texture map using the pseudocolors assigned in step 1 as a stencil.

These four steps are described in more detail below. The first step, namely the painting of a unique pseudocolor into each triangle as a color id tag, uses an auxiliary buffer the same size as the texture map. Every pixel within the triangle is assigned the pseudocolor of that triangle. An RGB image can be used, which means that $2^{24}$ colors are available. (For ease of monitoring and debugging, each pseudocolor or face color "id" tag is converted into R, G, and B values by first un-interleaving the bits and then bit-reversing each color byte. This results in a color progression where the high-order bits in each channel vary most rapidly.) After the initial coloring, the pseudocolors are grown into invisible regions using a simple dilation operation, i.e., iteratively replacing invisible pixels with one of their visible neighbor pseudocolors. This operation is performed in order to eliminate small gaps in the texture map, and to support filtering operations such as bilinear texture mapping and MIP mapping of the type disclosed in Williams, "Pyramidal Parametrics", *Computer Graphics*, Vol. 17, No. 3, pages 1–11, July 1983. For example, when using a six-sided cube, the (u,v) coordinates of each square vertex are set to be slightly inside the margins of the texture map. Thus, each texture map covers a little more region than it needs to, but such texture filtering and MIP mapping can be performed without worrying about edge effects.

The second step computes the (u,v,1)–to–(X,Y,Z) mapping for each triangle T by finding the 3-by-3 matrix $M_T$ which satisfies $u_i = M_T p_i$ for each of the three triangle vertices i of the triangle T. Thus, $M_T = UP^{-1}$, where $U=[u_0|u_1|u_2]$ and $P=[p_0|p_1|p_2]$ are formed by concatenating the $u_i$ and $p_i$ 3-vectors. ($u_i$ is a vector locating one of the three triangle vertices in u,v coordinates, while $p_i$ is a vector locating one of the three triangle vertices in X,Y,Z space.) This mapping is essentially a mapping of the triangle T from 3D directions in space (since the cameras are all at the origin) to (u,v) coordinates.

In the third step, a bounding box is computed around each triangle T in (u,v) space and is then enlarged slightly (by the same amount as the dilation in step 1). A composite image corresponding to the bounding box is formed by blending all of the input images i according to the transformation $x_k \sim M_k M_T^{-1} u$ for u inside the bounding box. This is a full, 8-parameter perspective transformation. It is not the same as the 6-parameter affine map which would be obtained by simply projecting a triangles vertices into the image, and then mapping these 2D image coordinates into 2D texture space (in essence ignoring the foreshortening in the projection onto the 3D model). The error in applying this naive but erroneous method to large texture map facets (e.g., those of a simple unrefined cube) would be quite large.

In the fourth step, the pseudocolor associated with each pixel inside the composited image is found. This is done by referring to the pseudocolor of the triangle T associated with the matrix $M_T$ used to compute $x_k \sim M_k M_T^{-1} u$. The composited pixel value (color or intensity) is placed into a corresponding pixel location in a triangle in the texture map if the pseudocolor of the composited pixel (stored in the auxiliary buffer constructed in step 1 above) matches the face color id tag of that triangle. The pseudocoloring/stenciling method described here facilitates the assignment of appropriate composite pixel values to pixel locations in invisible regions of the texture map by propagating pseudocolor id tags of pixels in visible regions into nearby invisible regions, as described above.

Figure 32:
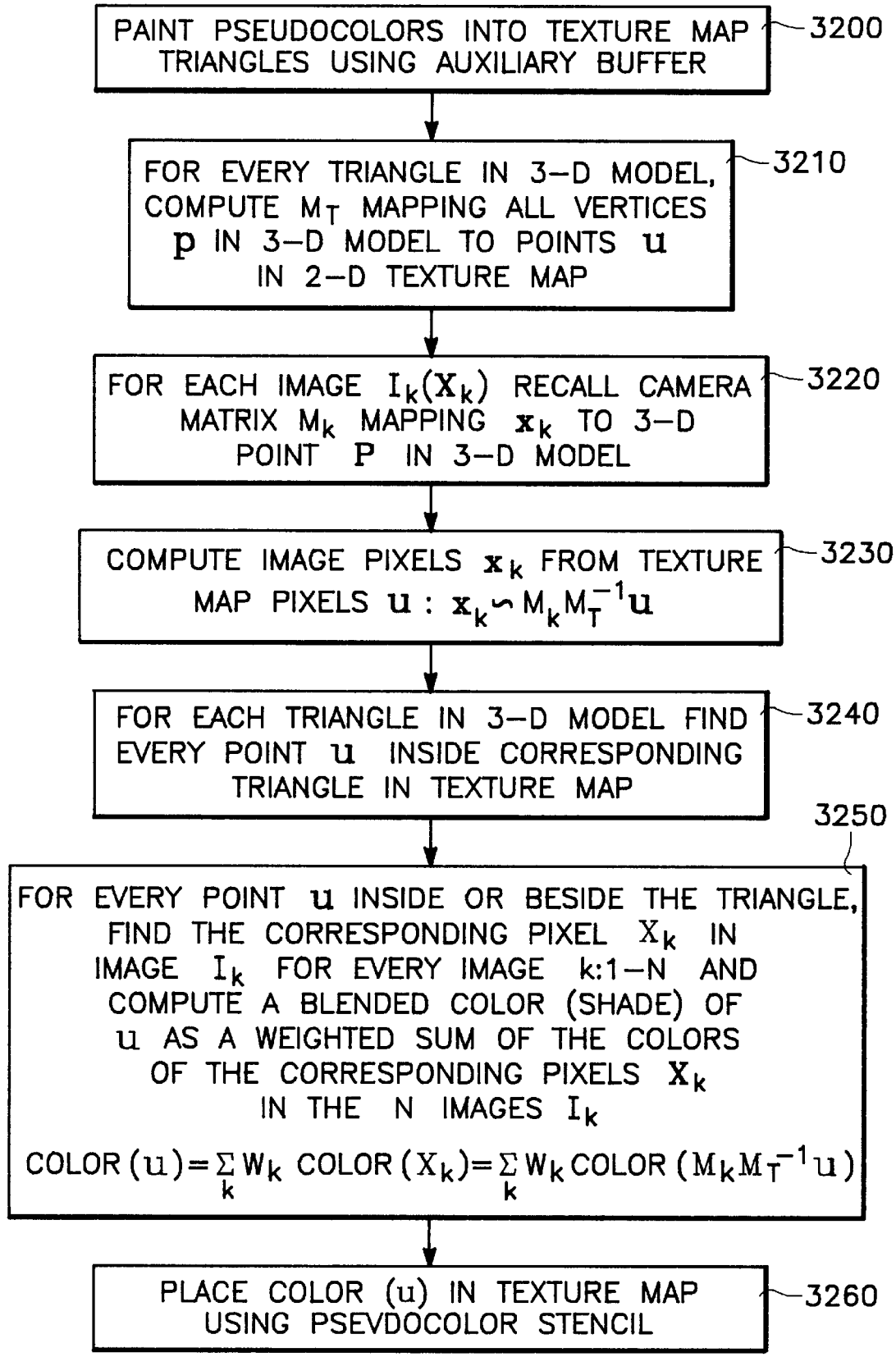
FIG. 32 is a flow diagram illustrating the texture map computation process.

FIG. 32 illustrates the texture mapping method. In step 3200, a unique pseudocolor is painted into each triangle in the texture model, and pseudocolors are grown into invisible regions as described above. In step 3210, a texture transformation or mapping between vertices in 3D space and texture (uv) coordinates space is determined for each triangle T. For each image, the corresponding alignment transformation matrix is recalled in step 3220. In step 3230, the texture transformation for a given triangle T and the image alignment transformation matrix are combined to directly map image pixels from the particular image to pixel locations in the texture map. In step 3240, a point in texture space is found for every point in a given triangle of the 3D model, thus defining the pixels in the corresponding triangle in texture space. In step 3250, for every point in a bounding box surrounding a given triangle in texture space, a mapping to the corresponding pixel in every overlapping image is found, and those corresponding pixel values (colors or intensities) are blended to form a composited pixel value. The blending of the corresponding pixel values employs a weighted average according to $$color(u) = \sum_k w_k color(x_k).$$

Since the pixel coordinate locations in image k are defined above as $x_k \sim M_k M_T^{-1} u$, the foregoing relationship may be expressed as to $$color(u) = \sum_k w_k color(M_k M_T^{-1} u).$$

Each weight $w_k$ is proportional to the proximity of the image pixel location $x_k$ to the center of the particular image $I_k$. This feature down-weights pixels near edges so as to reduce edge effects in the composited image (such as edge effects arising from exposure differences between images). In step 1360, the pseudocolors of the composited pixel values are found as described above, and compared with the pseudocolors of the texture map triangles. Each composited pixel value is placed in corresponding texture map pixel location having the same pseudocolor.

The method can also be used to project a collection of images onto an arbitrary object, i.e., to do true inverse texture mapping, by extending the method to handle occlusions. To do this, the pseudocolored polyhedral model is painted into each input image using a z-buffering algorithm (this is called an item buffer in ray tracing). When compositing the image for each face, it is preferable to determine which pixels match the desired pseudocolor, and set those which do not match to be invisible (i.e., not contributing to the final composite).

WORKING EXAMPLES:

The results of applying the global and local alignment methods to image mosaicing are now described. These methods have been tested on a number of real image sequences. All of the experiments used the rotational panoramic representation with unknown focal length.

Global Alignment:

The first example shows how misregistration errors quickly accumulate in sequential registration. FIG. 33A shows a big gap at the end of registering a sequence of 24 images (image size 300–by–384) where an initial estimate of focal length 256 is used. The double image of the right painting on the wall signals a big misalignment. This double image is removed, as shown in FIG. 33B, by applying the global alignment method which simultaneously adjusts all frame rotations and computes a new estimated focal length of 251.8.

Earlier in this specification, a "gap closing" technique was suggested for handling the accumulated misregistration error. However, this technique only works well for a sequence of images with uniform motion steps. It also requires that the sequence of images swing a great circle on the viewing sphere. The global alignment method, on the other hand, does not make such assumptions. For example, the global alignment method can handle the misalignment (double image on the right side of big banner and skylight frame as shown in FIG. 33C) of an image mosaic which is constructed from a sequence of images taken with a camera tilted up. FIG. 33D shows the image mosaic after block adjustment where the visible artifacts are no longer apparent.

Figure 34A:
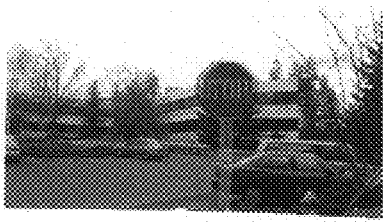
Figure 34B:
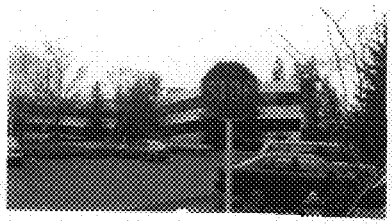
Figure 34C:
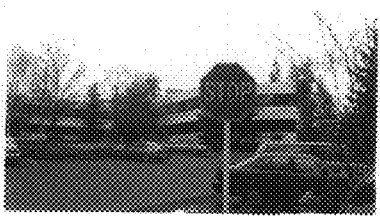
Figure 34D:
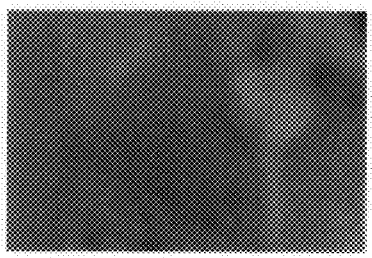
Figure 34E:

Local Alignment (De-Ghosting):

The next two examples illustrate the use of local alignment for sequences where the global motion model is clearly violated. The first example consists of two images taken with a hand-held digital camera (Kodak DC40) where some camera translation is present. The parallax introduced by this camera translation can be observed in the registered image (FIG. 34A) where the front object (a stop sign) causes a double image because of the misregistration. This misalignment is significantly reduced using the local alignment method as seen in FIG. 34B. However, some visual artifacts still exist because the local alignment is patch-based (e.g., patch size 32 is used in FIG. 34B). To overcome this problem, it is preferable to repeatedly apply local alignment with a larger patch size followed by a smaller one, which has the advantage of being able to handle large motion parallax and refine local alignment. FIG. 34C shows the result after applying local alignment three times with patch sizes of 32, 16 and 8. The search range has been set to be half of the patch size for reliable patch motion estimation. FIG. 34D shows the flow field corresponding to the left image of FIG. 34E.

Figure 35A:
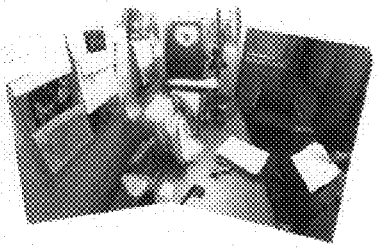
Figure 35B:
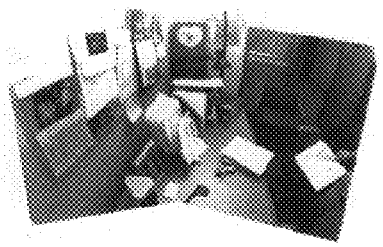
Figure 35C:
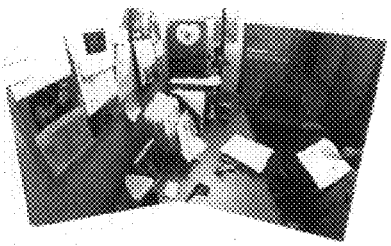
Figure 35D:
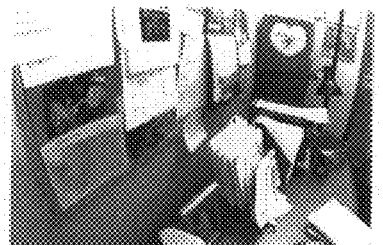

The global motion model also becomes invalid when registering two images with strong optical distortion. One way to deal with radial distortion is to carefully calibrate the camera. Using local alignment, it is possible to register images with optical distortion, without using explicit camera calibration (i.e., recovering lens radial distortion). (The recovered deformation field is not guaranteed, however, to be the true radial distortion, especially when only a few images are being registered. The minimum norm field is selected at each deghosting step.) FIG. 35D shows one of two images taken with a Pulnix camera and a Fujinon F2.8 wide angle lens. This picture shows significant radial distortion; notice how straight lines (e.g., the door) are curved. The registration result is shown in FIG. 35A. The mosaic after deghosting with a patch size 32 and search range 16 is shown in FIG. 35B. FIG. 35C shows an improved mosaic using repeated local alignment with patch sizes 32, 16, 8.

Figure 36A:
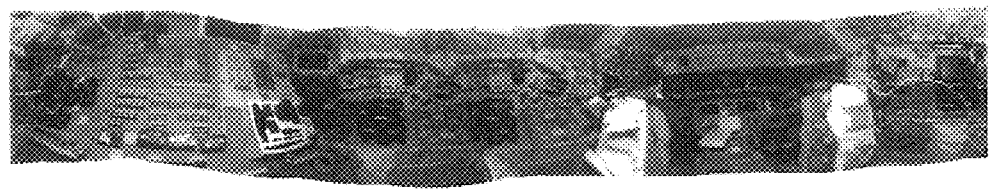
Figure 36B:
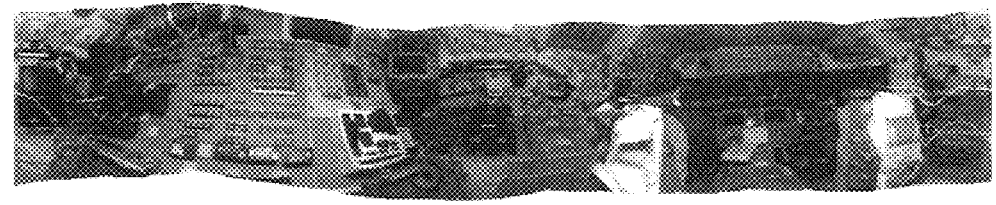
Figure 36C:

Two additional examples of large panoramic mosaics are presented here. The first mosaic uses a sequence of 14 images taken with a hand-held camera by an astronaut on the Space Shuttle flight deck. This sequence of images has significant motion parallax and is very difficult to register. The accumulated error causes a very big gap between the first and last images as shown in FIG. 36A (notice the repeated "1 2 3" numbers, which should only appear once). A good quality panorama (FIG. 36B) is constructed using the block adjustment method (there is some visible ghosting, however, near the right pilot chair). This panorama is further refined with deghosting as shown in FIG. 36C. These panoramas were rendered by projecting the image mosaic onto a tessellated spherical map using the method for building texture-mapped polyhedra from panoramic image mosaics described above in this specification.

The final example shows how to build a full view panoramic mosaic. Three panoramic image sequences of a building lobby were taken with the camera on a tripod tilted at three different angles (with 22 images for the middle sequence, 22 images for the upper sequence, and 10 images for the top sequence). The camera motion covers more than two thirds of the viewing sphere, including the top. After registering all of the images sequentially with patch-based alignment, the global and local alignment methods are applied to obtain the final image mosaic, shown in FIGS. 37A through 37D. These four views of the final image mosaic are equivalent to images taken with a very large rectilinear lens.

Environment/Texture Mapping:

FIG. 38 shows the results of mapping a panoramic mosaic onto a longitude-latitude tessellated globe. The white triangles at the top are the parts of the texture map not covered in the 3D tessellated globe model (due to triangular elements at the poles).

APPLICATIONS AND ADVANTAGES OF THE INVENTION:

The invention solves a number of problems encountered in constructing full view panoramic image mosaics from image sequences. Instead of projecting all of the images onto a common surface (e.g., a cylinder or a sphere), a representation is used that associates a rotation matrix and a focal length with each input image. Based on this rotational panoramic representation, block adjustment (global alignment) and deghosting (local alignment) methods disclosed herein significantly improve the quality of image mosaics, thereby enabling the construction of mosaics from images taken by hand-held cameras. When constructing an image mosaic from a long sequence of images, error accumulation problems must be dealt with. The solution is to simultaneously adjust all frame poses (rotations and focal lengths) so that the sum of registration errors between all matching pairs of images is minimized. Geometrically, this is equivalent to adjusting all ray directions of corresponding pixels in overlapping frames until they converge. Using corresponding "features" in neighboring frames, which are obtained automatically using the patch-based alignment method, the minimization problem is formulated to recover the poses without explicitly computing the converged ray directions. This leads to a linearly-constrained non-linear least squares problem which can be solved very efficiently. To compensate for local misregistration caused by inadequate motion models (e.g., camera translation or moving object) or imperfect camera projection models (e.g., lens distortion), the image mosaic is refined using the deghosting method. Each image is divided into small patches to compute the patch-based alignments. Each image is locally warped so that the overall mosaic does not contain visible ghosting. To handle large parallax or distortion, the deghosting method is initiated with a large patch size. This deghosting step is then repeated with smaller patches so that local patch motion can be estimated more accurately. The deghosting method can also be applied to the problem of extracting texture maps for general 3D objects from images. When constructing such texture maps by averaging a number of views projected onto the model, even slight misregistrations can cause blurring or ghosting effects. The deghosting method solves this problem, and can inherently compensate for related problems such as errors in the estimated camera geometry and intrinsic camera models. To summarize, the global and local alignment methods, together with the efficient patch-based implementation, make it easy to quickly and reliably construct high-quality full view panoramic mosaics from arbitrary collections of images, without the need for special photographic equipment. By mapping the mosaic onto an arbitrary texture-mapped polyhedron surrounding the origin, the virtual environment is exploited using standard 3D graphics viewers and hardware without requiring special purpose players. It is believed that this will make panoramic photography and the construction of virtual environments much more interesting to a wide range of users, and stimulate further research and development in image-based rendering and the representation of visual scenes.

While the invention has been described in detail with reference to its preferred embodiments, it is understood that variations and modifications thereof may be made without departing from the true spirit and scope of the invention.

What is claimed is:

1. A method for locally aligning individual images in a set of overlapping images of a mosaic, comprising:

selecting one of said images;

determining, at plural predetermined pixel locations of said one image, motions between said one image and other images of said set;

combining said motions to produce an estimated motion at each of said plural predetermined pixel locations of said one image; and warping said one image in accordance with the estimated motions.

2. The method of claim 1 wherein the determining step is preceded by determining which of said images of said set overlies said one image.

3. The method of claim 2 wherein the step of determining which of said images overlies said one image comprises:

determining alignment transformations relating said images to a 3-dimensional coordinate system; and inferring mutual overlap between images from said transformations.

4. The method of claim 3 further comprising:

initially resampling said images in accordance with said alignment transformations.

5. The method of claim 3 wherein the step of determining alignment transformations comprises performing an incremental alignment process.

6. The method of claim 5 wherein said incremental alignment process comprises a patch-based alignment process.

7. The method of claim 6 wherein said a patch-based alignment process comprises computing an incremental deformation of said one image.

8. The method of claim 7 wherein said incremental deformation comprises a planar perspective transform.

9. The method of claim 7 wherein said incremental deformation comprises a 3-dimensional rotational transform.

10. The method of claim 1 wherein the step of warping comprises:
constructing a mapping of warped pixel locations from said estimated motions; and
resampling said one image at said warped pixel locations.

11. The method of claim 10 wherein said mapping comprises a reverse mapping of pixels in an unwarped version of said one image.

12. The method of claim 10 wherein said plural predetermined pixels are a sparse set of pixel locations of said one image and wherein the step of constructing a mapping comprises:
computing an estimated motion for a dense set of pixel locations in said one image based upon the estimated motions of said sparse set of predetermined pixel locations.

13. The method of claim 12 further comprising dividing said one image into plural patches, and assigning a center pixel location in each patch to be a corresponding one of said plural predetermined pixel locations.

14. The method of claim 13 wherein said dense set of pixel locations comprise all pixel locations in said one image.

15. The method of claim 12 wherein the step of computing an estimated motion for said dense set of pixel locations comprises:
computing, for each pixel location of said dense set of pixel locations, an average of estimated motions of neighboring ones of said plural predetermined pixel locations weighted in accordance with their proximity to the one pixel location.

16. The method of claim 1 wherein the step of combining said motions to produce an estimated motion comprises computing a normalized average of said motions.

17. The method of claim 16 further comprising downweighting said motions in said average by a fraction proportional to the number n of said motions in said average.

18. The method of claim 17 wherein said fraction is 1/(n+1).

19. The method of claim 1 wherein said steps of determining, combining and warping are performed for all of said images simultaneously.

20. A system for locally aligning individual images in a set of overlapping images of a mosaic, comprising:
a set of relative motion estimators which estimate relative motions between respective pairs of said images;
for each one of said images, an averager which computes an average of a set of said relative motions said one image; and
for each one of said averagers, a local warper which warps said one image in accordance with said average.

21. The system of claim 20 wherein said averager comprises
summer which adds said relative motions to produce a sum; and
a divider which divides said sum by a normalization factor.

22. The system of claim 21 wherein said normalization factor is proportional to the number n of images comprising said respective pairs.

23. The system of claim 22 wherein said fraction is 1/(n+1).

24. The system of claim 23 wherein said sparse data interpolator comprises a weighter which weights said relative motions in accordance with the proximities of the corresponding sparse set of pixel locations to the one pixel location of said dense set of pixel locations.

25. The system of claim 20 wherein said relative motions are of a sparse set of pixel locations in said one image.

26. The system of claim 25 further comprising:
a sparse data interpolator for computing, from said relative motions of said sparse set of pixel locations, a motion estimate for each one of a dense set of pixel locations, and wherein said local warper receives as its input the motion estimates for said dense set of pixel locations and said one image.

27. The system of claim 26 wherein said one image is divisible into contiguous patches and wherein each pixel location of said sparse set of pixel locations lies in a respective one of said patches.

28. The system of claim 27 wherein each pixel location of said sparse set of pixel locations is a center pixel location of a respective one of said patches.

29. A method for aligning individual images in a set of overlapping images of a mosaic, comprising:
determining pair-wise estimates of motions between said one image and other images of said set; and
warping said one image in accordance with said pair-wise estimates of motions.

30. The method of claim 29 wherein the warping step comprises:
combining said motions to produce an estimated motion of said one image; and
computing a warp of said one image from said estimate motion.

31. The method of claim 30 wherein the step of computing a warp comprises:
constructing a mapping of warped pixel locations from said estimated motion of said one image; and
resampling said one image at said warped pixel locations.

32. The method of claim 36 wherein said mapping comprises a reverse mapping of pixels in an unwarped version of said one image.

33. The method of claim 30 wherein the step of combining said motions to produce an estimated motion comprises computing a normalized average of said motions.

34. The method of claim 33 further comprising downweighting said motions in said average by a fraction proportional to the number n of said motions in said average.

35. The method of claim 34 wherein said fraction is 1/(n+1).

36. The method of claim 29 wherein the determining step is preceded by determining which of said images of said set overlies said one image.

37. The method of claim 36 wherein the step of determining which of said images overlies said one image comprises:
determining alignment transformations relating said images to a 3-dimensional coordinate system; and
inferring mutual overlap between images from said transformations.

38. The method of claim 37 further comprising:

initially resampling said images in accordance with said alignment transformations.

39. The method of claim 37 wherein the step of determining alignment transformations comprises performing an incremental alignment process.

40. The method of claim 39 wherein said incremental deformation comprises a planar perspective transform.

41. The method of claim 39 wherein said incremental deformation comprises a 3-dimensional rotational transform.

42. The method of claim 39 wherein said incremental alignment process comprise dividing said one image into plural patches and performing a patch-based alignment process.

43. The method of claim 42 wherein the step of determining motions between said one image and other images of said set determines said motions at plural predetermined pixel locations of said one image, said plural predetermined pixel location being center pixel locations in respective ones of said patches.

44. The method of claim 43 wherein the step of warping comprises:

constructing a mapping of warped pixel locations from said estimated motions; and resampling said one image at said warped pixel locations.

45. The method of claim 44 wherein the step of constructing a mapping comprises:

computing an estimated motion for a dense set of pixel locations in said one image based upon the estimated motions of said sparse set of predetermined pixel locations.

46. The method of claim 45 wherein said dense set of pixel locations comprise substantially all pixel locations in said one image.

47. The method of claim 45 wherein the step of computing an estimated motion for said dense set of pixel locations comprises:

computing, for each pixel location of said dense set of pixel locations, an average of estimated motions of neighboring ones of said plural predetermined pixel locations weighted in accordance with their proximity to the one pixel location.

48. The apparatus of claim 45 wherein said processor computes an estimated motion for said dense set of pixel locations in that said processor:

computes, for each pixel location of said dense set of pixel locations, an average of estimated motions of neighbors ones of said plural predetermined pixel locations weighted in accordance with their proximity to the one pixel location.

49. The method of claim 29 wherein the steps of determining and warping are performed for all of said images simultaneously.

50. Apparatus for use in aligning individual images in a set of overlapping images of a mosaic, comprising:

a processor;

memory having executable instructions stored therein; and, wherein the processor, in response to the instructions stored in the memory:

determines pair-wise estimates of motions between said one image and other images of said set; and warps said one image in accordance with said pair-wise estimates of motions.

51. The apparatus of claim 50 wherein said processor warps said one image by:

combining said motions to produce an estimated motion of said one image.

52. The apparatus of claim 50 wherein the processor, in further response to said instructions, determines which of said images of said set overlies said one image prior to determining said pair-wise estimates.

53. The apparatus of claim 52 wherein said processor determines which of said images overlies said one image in that said processor:

determines alignment transformations relating said images to a 3-dimensional coordinate system; and infers mutual overlap between images from said transformations.

54. The apparatus of claim 53 wherein said processor in further response to said instructions:

initially resamples said images in accordance with said alignment transformations.

55. The apparatus of claim 50 wherein said processor warps said one image in that said processor:

constructs a mapping of warped pixel locations from said estimated motions; and resamples said one image at said warped pixel locations.

56. The apparatus of claim 55 wherein said mapping comprises a reverse mapping of pixels in an unwarped version of said one image.

57. The apparatus of claim 50 wherein said processor combines said motions to produce an estimated motion by computing a normalized average of said motions.

58. The apparatus of claim 57 wherein said processor in further response to said instructions downweights said motions in said average by a fraction proportional to the number n of said motions in said average.

59. The apparatus of claim 58 wherein said fraction compensates for overcorrection in said average.

60. The apparatus of claim 59 wherein said fraction is $1/(n+1)$.

61. The apparatus of claim 50 wherein said processor in further response to said instructions selects a next one of said images and, for said next one image, determines said pair-wise motions and warps said one image.

62. The apparatus of claim 50 said processor determines motions between said one image and other images of said set by determining said motions at plural predetermined pixel locations of said one image.

63. The apparatus of claim 62 wherein said processor warps said one image in that said processor:

constructs a mapping of warped pixel locations from said estimated motions; and resamples said one image at said warped pixel locations.

64. The apparatus of claim 63 wherein said processor constructs a mapping by computing an estimated motion for a dense set of pixel locations in said one image based upon the estimated motions of said sparse set of predetermined pixel locations.

65. The apparatus of claim 64 wherein said dense set of pixel locations comprise substantially all pixel locations in said one image.

* * * * *

UNITED STATES PATENT AND TRADEMARK OFFICE
CERTIFICATE OF CORRECTION

PATENT NO.   : 5,986,668
DATED        : November 16, 1999
INVENTOR(S)  : Richard Szeliski and Heung-Yeung Shum It is certified that error appears in the above-identified patent and that said Letters Patent is hereby corrected as shown below:

<u>Column 6,</u>
Line 46, change "amoints" to -- amounts --;

<u>Column 9,</u>
Line 38, change "f" to -- $f$ --;

Line 61, Change "I₁(x)=I₁(f(x;m))" to
-- $\tilde{I}_1$(x)=I₁(f(x;m)) --;

<u>Column 10,</u>
Line 17, after "symbol" insert -- ~ --;
Line 34, change "M< (1+D) M" to -- M← (I+D) M --;

<u>Column 11,</u>
Line 14, change " $E(d) = \sum_i \left[ 1_1(x_i^{"}) - I_o(x_i) \right]^2$ " to $$-- E(d) = \sum_i \left[ \tilde{I}_1(x_i^{"}) - I_o(x_i) \right]^2 --;$$

Line 17, change " $\approx \sum_i [1_1(x_i) + \nabla 1_i(x_i)\frac{\partial x_i^{"}}{\partial d}d - I_0(x_i)]^2 = \sum_i [g_i^T J_i^T d + e_i]^2$ "

to -- $\approx \sum_i [\tilde{I}_1(x_i) + \nabla \tilde{I}_1(x_i)\frac{\partial x_i^{"}}{\partial d}d - I_0(x_i)]^2 = \sum_i [g_i^T J_i^T d + e_i]^2$ --;

Line 22, change "□" to -- $\nabla$ --;

Line 36, change "harid" to -- hand --;

<u>Column 13,</u>
Line 4, change "24" to -- 2-4 --;
Line 38, change "C" to -- c --;

Page 1 of 4

UNITED STATES PATENT AND TRADEMARK OFFICE
CERTIFICATE OF CORRECTION

PATENT NO.    : 5,986,668         Page 2 of 4
DATED         : November 16, 1999
INVENTOR(S)   : Richard Szeliski and Heung-Yeung Shum It is certified that error appears in the above-identified patent and that said Letters Patent is hereby corrected as shown below:

Column 13 cont'd.
Line 64, change "$R_t \leftarrow \hat{R}(\Omega) R_t M \leftarrow V\hat{R}\omega R R_k^{-1} V^{-1}$" to
$$-- R_t \leftarrow \hat{R}(\Omega) R_t \quad \text{or} \quad M \leftarrow V\hat{R}(\Omega) R_t R_k^{-1} V^{-1} --;$$

Line 66, change "($\omega$)" to -- ($\Omega$) --;

Column 14,
Line 2, change "$\dot{R}\dot{n},(f) = I + (\sin(f))X(\dot{n}) + (1-\cos(f))X(\dot{n})^2$" to
$$-- \hat{R}(\hat{n}, \theta) = I + (\sin\theta)X(\hat{n}) + (1-\cos\theta)X(\hat{n})^2 --;$$

Line 6, change "$\theta = \|\Omega\|, \dot{n} = \Omega/\theta,$" to
$$--\theta = \|\Omega\|, \hat{n} = \Omega/\theta, --;$$

Column 15,
Line 57, change "$f_0^2 = \sqrt{\dfrac{m_5^2 - m_2^2}{m_0^2 + m_1^2 - m_3^2 - m_4^2}} \quad \text{if} \quad m_0^2 + m_1^2 - m_3^2 - m_4^2 \neq 0$"

to -- $f_0^2 = \dfrac{m_5^2 - m_2^2}{m_0^2 + m_1^2 - m_3^2 - m_4^2} \quad \text{if} \quad m_0^2 + m_1^2 - m_3^2 - m_4^2 \neq 0$ --;

Column 16,
Line 3, change "$f_1^{-2} = \sqrt{\dfrac{m_0^2 + m_3^2 - m_1^2 - m_4^2}{m_7^2 - m_6^2}} \quad \text{if} \quad m_7^2 - m_6^2 \neq 0$"

to -- $f_1^2 = \dfrac{m_0^2 + m_3^2 - m_1^2 - m_4^2}{m_7^2 - m_6^2} \quad \text{if} \quad m_7^2 - m_6^2 \neq 0$ --;

Line 10, change "$f_1^{-2} = -\dfrac{m_0 m_1 + m_3 m_4}{m_6 m_7} \quad \text{if} \quad m_6 \neq 0 \text{ and } m_7 \neq 0.$"

to -- $f_1^2 = -\dfrac{m_0 m_1 + m_3 m_4}{m_6 m_7} \quad \text{if} \quad m_6 \neq 0 \text{ and } m_7 \neq 0.$ --;

Line 16, change "o ffare" to --of f are--;

Line 34, change "$f_f = (1+e_k)f_k, i.e.,$" to
$$-- f_k = (1+e_k)f_k, i.e., --;$$

UNITED STATES PATENT AND TRADEMARK OFFICE
CERTIFICATE OF CORRECTION

PATENT NO. : 5,986,668
DATED : November 16, 1999
INVENTOR(S) : Richard Szeliski and Heung-Yeung Shum It is certified that error appears in the above-identified patent and that said Letters Patent is hereby corrected as shown below:

Column 17,
Line 6, change "$(\partial M / \partial p)M^{-1}$" to --$(\partial M / \partial p)M^{-1}$--;

Line 25, change "14))." to -- (14)). --;
Line 47, change "$J_i$" to -- $J_j$ --;

Column 18,
Line 7, change "$(2s+)^2$" to -- $(2s+1)^2$ --;

Column 21,
Line 16, change "I1" to -- $I_1$ --;

Column 23,
Line 12, change "$E(\{R_k, f_k\}) = \sum_{j,k,l \in N_{jk}} \|H_{jk}y_k - H_l y_l + e_{jkl}\|^2$" to --$E(\{R_k, f_k\}) = \sum_{j,k,l \in N_{jk}} \|H_{jk}y_k - H_{j_l}y_l + e_{jkl}\|^2$--;

Column 24,
Line 1, change "Combridge," to -- Cambridge --;
Line 9, change "$\delta f_k = \delta f$ and $\Omega_k = \Omega_1$" to --$\delta f_k = \delta f_l$ and $\Omega_k = \Omega_1$--;

Column 25,
Line 30, change "$\bar{u}_{jk} = \bar{x}_{jk} - x_{jk} = \frac{1}{n_{jk+1}} \sum_{l \in N_{jk}} (\tilde{x}_{jl} - x_{jl}) = \frac{1}{n_{jk}} + \sum_{l \in N_{jk}} u_{jl}$" to --$\bar{u}_{jk} = \bar{x}_{jk} - x_{jk} = \frac{1}{n_{jk+1}} \sum_{l \in N_{jk}} (\tilde{x}_{jl} - x_{jk}) = \frac{1}{n_{jk}} + \sum_{l \in N_{jk}} u_{jl}$--;

Line 62, change "$I_k$" to --$\hat{I}_k$--;

Line 64, change "Holdovers" to -- foldovers --;

UNITED STATES PATENT AND TRADEMARK OFFICE
CERTIFICATE OF CORRECTION

Figure 30:
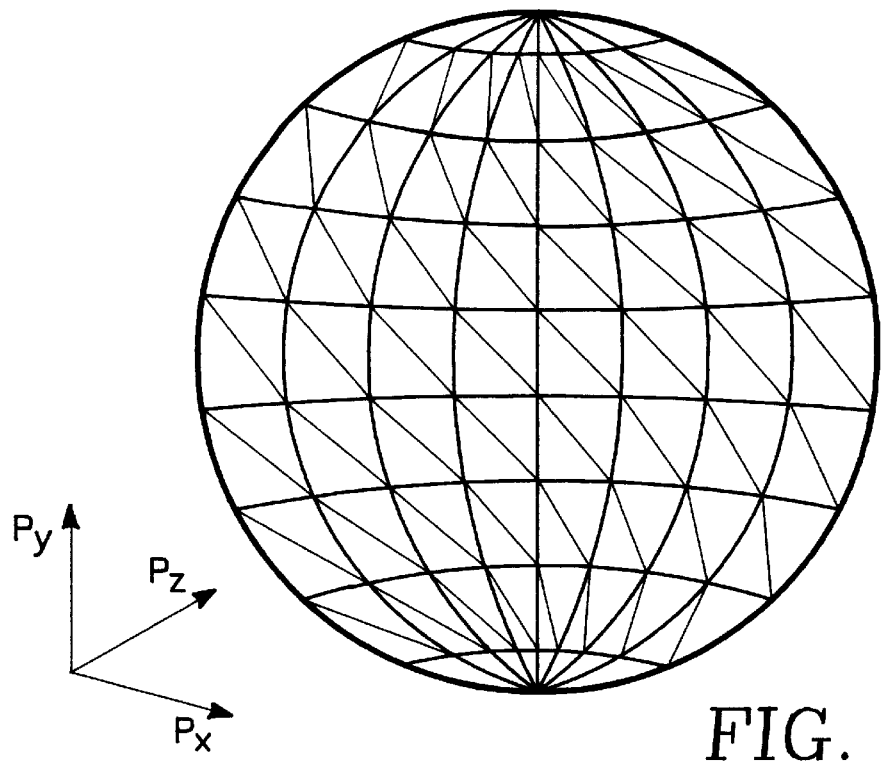
FIGS. 30 and 31 illustrate a spherical 3D model and corresponding 2D texture map for carrying out one embodiment of the texture mapping method.

PATENT NO.   : 5,986,668
DATED        : November 16, 1999
INVENTOR(S)  : Richard Szeliski and Heung-Yeung Shum It is certified that error appears in the above-identified patent and that said Letters Patent is hereby corrected as shown below:

Column 28,
Line 15, change "FIG." to -- FIG. 30 --;
Line 55, change " $P=[p_0 \mid 0_1 \mid p_2]$ " to -- $P=[p_0 \mid p_1 \mid p_2]$ --;

Column 30,
Line 36, change "of images" to -- of 10 images --;

Signed and Sealed this

Twenty-third Day of July, 2002

*Attest:*

*Attesting Officer*

JAMES E. ROGAN
*Director of the United States Patent and Trademark Office*